United States Patent
Chen et al.

(10) Patent No.: US 12,089,223 B2
(45) Date of Patent: Sep. 10, 2024

(54) SIGNAL RECEPTION OR TRANSMISSION METHOD AND APPARATUS AND SYSTEM

(71) Applicant: FUJITSU LIMITED, Kawasaki (JP)

(72) Inventors: Zhe Chen, Beijing (CN); Lei Song, Beijing (CN); Xianjun Yang, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 351 days.

(21) Appl. No.: 17/470,030

(22) Filed: Sep. 9, 2021

(65) Prior Publication Data

US 2021/0410124 A1 Dec. 30, 2021

Related U.S. Application Data

(63) Continuation of application No. PCT/CN2019/080190, filed on Mar. 28, 2019.

(51) Int. Cl.
*H04W 72/23* (2023.01)
*H04W 72/0453* (2023.01)

(52) U.S. Cl.
CPC ....... *H04W 72/23* (2023.01); *H04W 72/0453* (2013.01)

(58) Field of Classification Search
CPC ............. H04W 72/23; H04W 72/0453; H04W 72/1263; H04W 72/0446; H04W 72/046; H04B 7/0413; H04L 1/1854; H04L 1/1864; H04L 1/1887; H04L 1/1896; H04L 5/0048; H04L 5/0053; H04L 5/0091; H04L 5/0023; H04L 1/0028; H04L 5/0094
See application file for complete search history.

(56) References Cited

U.S. PATENT DOCUMENTS

| | | |
|---|---|---|
| 2019/0190747 A1 | 7/2019 | Park et al. |
| 2020/0044779 A1 | 2/2020 | Ma et al. |
| 2021/0084623 A1 | 3/2021 | Zhang et al. |

(Continued)

FOREIGN PATENT DOCUMENTS

| | | |
|---|---|---|
| CN | 108199819 A | 6/2018 |
| CN | 108260217 A | 7/2018 |

(Continued)

OTHER PUBLICATIONS

3GPP TS 38.214 V15.5.0 ,5G; NR; Physical layer procedures for data , May 2019, 3GPP (Year: 2019).*

(Continued)

*Primary Examiner* — Said M Elnoubi
(74) *Attorney, Agent, or Firm* — Myers Wolin, LLC

(57) ABSTRACT

A signal reception or transmission method and apparatus and a communication system. The signal reception or transmission method includes: a terminal equipment receives downlink control information, the number of bits of at least one of fields of the downlink control information being less than the number of bits of a corresponding field of regular downlink control information; and the terminal equipment receives or transmits a signal scheduled by the downlink control information according to spatial direction indication of the downlink control information. According to this disclosure, the terminal equipment and the network device may receive or transmit a corresponding signal by using accurate power and spatial direction.

8 Claims, 4 Drawing Sheets

---

401 a terminal equipment receives downlink control information transmitted by a network device, the downlink control information including a scheduling offset

402 the terminal equipment receives a downlink signal scheduled by the downlink control information, or transmits an uplink signal scheduled by the downlink control information, according to spatial direction indication to which the scheduling offset corresponds or according to a pathloss reference signal to which the scheduling offset corresponds

(56) References Cited

U.S. PATENT DOCUMENTS

| | | | |
|---|---|---|---|
| 2021/0345305 A1* | 11/2021 | Takeda | H04W 72/23 |
| 2021/0359808 A1* | 11/2021 | Takeda | H04L 5/0023 |

FOREIGN PATENT DOCUMENTS

| | | |
|---|---|---|
| CN | 108737034 A | 11/2018 |
| CN | 109076364 A | 12/2018 |
| EP | 3 826 417 A1 | 5/2021 |
| WO | 2017/133364 A1 | 8/2017 |
| WO | 2018/203728 A1 | 11/2018 |

OTHER PUBLICATIONS

Sony, Remaining issues on Rel. 15 beam management, Oct. 8-12, 2018, 3GPP TSG-RAN WG1 #94bis, R1-1810628, Chengdu, China, (Year: 2018).*

Ericsson ,On signalling reduction for beam management, , Aug. 20-24, 2018, 3GPP TSG-RAN WG1 Meeting #94, R1-1809214, Gothenburg, Sweden. (Year: 2018).*

ZTE, Discussion on cross-carrier scheduling with different numerologies, Feb. 25-Mar. 1, 2019, 3GPP TSG RAN WG1 Meeting #96, R1-1901777, Athens, Greece, (Year: 2019).*

Examination Report issued by the Indian Patent Office for corresponding Indian Patent Application No. 202137039937, dated Apr. 26, 2022, with an English translation.

Notice of Reasons for Refusal issued by the Japan Patent Office for corresponding Japanese Patent Application No. 2021-556931, mailed on Nov. 22, 2022, with an English translation.

NTT Docomo, Inc., "Potential enhancements to PDCCH", Agenda Item: 7.2.6.1.1, 3GPP TSG-RAN WG1 Meeting #96, R1-1902804, Athens, Greece, Feb. 25-Mar. 1, 2019.

3GPP TR 38.824 V16.0.0, "3rd Generation Partnership Project; Technical Specification Group Radio Access Network; Study on physical layer enhancements for NR ultra-reliable and low latency case (URLLC) (Release 16)", Mar. 2019.

3GPP TS 38.213 V15.5.0, "3rd Generation Partnership Project; Technical Specification Group Radio Access Network; NR; Physical layer procedures for control (Release 15)", Mar. 2019.

3GPP TS 38.214 V15.5.0, "3rd Generation Partnership Project; Technical Specification Group Radio Access Network; NR; Physical layer procedures for data (Release 15)", Mar. 2019.

ZTE Corporation, "Discussion on cross-carrier scheduling with different numerologies", 3GPP TSG-RAN WG1 Meeting #96, R1-1901777, Athens, Greece, Feb. 25-Mar. 1, 2019.

3GPP TS 38.321 V15.4.0, "3rd Generation Partnership Project; Technical Specification Group Radio Access Network; NR; Medium Access Control (MAC) protocol specification (Release 15)", Dec. 2018.

Sony, "Remaining issues on Rel. 15 beam management", Agenda Item: 7.1.2.3, 3GPP TSG-RAN WG1 Meeting #94bis, R1-1810628, Chengdu, China, Oct. 8-12, 2018.

OPPO, "Remaining issues on uplink power control for non-CA", 3GPP TSG-RAN WG1 Meeting #92bis, R1-1803972, Sanya, China, Apr. 16-20, 2018.

Ericsson, "On signalling reduction for beam management", 3GPP TSG-RAN WG1 Meeting #94, Tdoc R1-1809214, Gothenburg, Sweden, Aug. 20-24, 2018.

International Search Report and Written Opinion of the International Searching Authority issued by the China National Intellectual Property Administration for International Patent Application No. PCT/CN2019/080190, mailed on Dec. 11, 2019, with an English translation.

Nokia et al., "Feature Lead summary on QCL", Agenda Item: 7.1.2.3.7, 3GPP TSG-RAN WG1 Meeting #92bis, R1-1805660, Sanya, People Republic of China, Apr. 16-20, 2018.

Intel Corporation, "On compact DCI format for NR URLLC", Agenda Item: 7.2.2, 3GPP TSG-RAN WG1 Meeting #92bis, R1-1804740, Sanya, China, Apr. 16-20, 2018.

Extended European search report with the European search opinion issued by the European Patent Office for corresponding European Patent Application No. 19920675.6-1206, mailed on Jun. 10, 2022.

Declaration issued by the European Patent Office for corresponding European Patent Application No. EP 19 92 0675, dated May 31, 2022.

Notice of Reasons for Refusal issued by the Japan Patent Office for corresponding Japanese Patent Application No. 2023-063731, mailed on Jan. 9, 2024, with an English translation.

First Notification of Office Action and Search Report issued by the China National Intellectual Property Administration for corresponding Chinese Patent Application No. 201980093375.8, mailed on Oct. 26, 2023, with an English translation.

* cited by examiner

301 a network device transmits downlink control information to a terminal equipment, a field of the downlink control information satisfying at least one of first conditions

FIG. 3

401 a terminal equipment receives downlink control information transmitted by a network device, the downlink control information including a scheduling offset

402 the terminal equipment receives a downlink signal scheduled by the downlink control information, or transmits an uplink signal scheduled by the downlink control information, according to spatial direction indication to which the scheduling offset corresponds or according to a pathloss reference signal to which the scheduling offset corresponds

FIG. 4

501 a network device transmits downlink control information to a terminal equipment, the downlink control information including a scheduling offset, the scheduling offset corresponding to a spatial direction indication or corresponding to a pathloss reference signal

FIG. 5

SIGNAL RECEPTION OR TRANSMISSION METHOD AND APPARATUS AND SYSTEM

CROSS-REFERENCE TO RELATED APPLICATION

This application is a continuation application of International Application PCT/CN2019/080190 filed on Mar. 28, 2019 and designated the U.S., the entire contents of which are incorporated herein by reference.

FIELD

This disclosure relates to the field of communications, and in particular to a signal reception or transmission method and apparatus and a system.

BACKGROUND

In a new radio system of the fifth generation mobile communication technology (5G-NR), signal transmission of some services needs to meet requirements on both low latency and high reliability. These services include distributed power system control, smart factories, and remote driving, etc. At present, existing communication systems are unable to meet the requirements on high reliability of these services. Therefore, there is a need to further enhance reliability of data transmission on the basis of existing communication systems.

On the other hand, in order to better adapt to transmission of data at high frequency bands, a beam management mechanism based on a state of transmission configuration indication (TCI) is proposed in a 5G-NR system. In particular, for downlink data transmission, a network device may configure a TCI state table used for indicating a physical downlink shared channel (PDSCH) at each downlink bandwidth part (BWP) by using radio resource control (RRC) signaling, an upper limit of the state table being 128 entries. In addition, the network device may indicate a subset of the above TCI state table by using a media access control control element (MAC-CE) signaling, an upper limit of entries in the subset being 8. For the PDSCH scheduled by downlink control information (DCI), there may exist a TCI field in the DCI, a size of the TCI field being 3 bits. The 8 states indicated by 3 bits correspond to the 8 entries in the subset of the above TCJ state table in a one-to-one manner. Therefore, the terminal may determine a TCJ state used for receiving a corresponding PDSCH according to indication of the TCJ field in the DCI, that is, quasi-colocation (QCL) assumption parameters used by receiving a corresponding PDSCH.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In general, signal transmission in a communication system is inseparable from indication of control information. Hence, enhancement of control information may greatly improve reliability of signal transmission. At present, a main method for increasing reliability of control information is reducing a size of the control information under a condition of using identical time-frequency resources and transmit power. The reason is that when bits of the control information are reduced, under identical conditions, more bits may be used for redundant coding of channels, thereby improving reliability of a control channel. In addition, in order to meet requirements of 5G-NR on different levels of high reliability in the future, the size (number of bits) of the control information may be appropriately varied according to demands of services.

It was found by the inventors that for the above control information, it may schedule a terminal to receive downlink signals, and it may also schedule the terminal to transmit uplink signals. However, there are no definite solution for how to indicate QCL assumption of a corresponding downlink signal when the control information performs downlink signal scheduling, how to indicate a spatial relation of a corresponding uplink signal when the control information performs uplink signal scheduling and how to indicate a pathloss reference signal used by a corresponding uplink signal for power control when the control information performs uplink signal scheduling.

In addition, it is assumed that a subcarrier spacing to which received downlink control information (DCI) corresponds is $K_{DCI}$, and subcarrier spacing to which a physical downlink shared channel (PDSCH)/physical uplink shared channel (PUSCH) scheduled by the DCI corresponds is $K_{data}$. Whether a subcarrier spacing of a scheduling offset therebetween them is based on $K_{DCI}$ or $K_{data}$ is indefinite. Moreover, as the scheduling offset needs to be compared with its corresponding terminal capability, whether a subcarrier spacing to which the terminal capability corresponds is based on $K_{DCI}$ or $K_{data}$ needs also to be determined.

In order to solve at least one of the above problems or other problems, embodiments of this disclosure provide a signal reception or transmission method and apparatus and a system.

According to a first aspect of the embodiments of this disclosure, there is provided a signal reception or transmission method, applicable to a terminal equipment, the method including:

receiving, by a terminal equipment, downlink control information transmitted by a network device, a field of the downlink control information satisfying at least one of the following conditions that:

if the downlink control information is used for scheduling a downlink signal, a field of frequency-domain resource assignment of the downlink control information is smaller than a field of frequency-domain resource assignment of DCI format 1_0;

if the downlink control information is used for scheduling an uplink signal, a field of frequency-domain resource assignment of the downlink control information is smaller than a field of frequency-domain resource assignment of DCI format 0_0;

a field of time-domain resource assignment is less than 4 bits;

a field of a modulation and coding scheme is less than 5 bits;

a field of HARQ process number is less than 4 bits;

a field of a redundancy version is less than 2 bits;

a field of a PUCCH resource indicator is less than 3 bits;

a field of a PDSCH-to-HARQ feedback timing indicator is less than 3 bits; and a field of a downlink assignment index is less than 2 bits;

receiving or transmitting a signal scheduled by the downlink control information by the terminal equipment according to spatial direction indication of the downlink control information.

According to a second aspect of the embodiments of this disclosure, there is provided a signal reception or transmission method, applicable a network device, the method including:

transmitting downlink control information by a network device to a terminal equipment, a field of the downlink control information satisfying at least one of the following conditions that:

if the downlink control information is used for scheduling a downlink signal, a field of frequency-domain resource assignment of the downlink control information is smaller than a field of frequency-domain resource assignment of DCI format 1_0;

if the downlink control information is used for scheduling an uplink signal, a field of frequency-domain resource assignment of the downlink control information is smaller than a field of frequency-domain resource assignment of DCI format 0_0;

a field of time-domain resource assignment is less than 4 bits;

a field of a modulation and coding scheme is less than 5 bits;

a field of the HARQ process number is less than 4 bits;

a field of a redundancy version is less than 2 bits;

a field of a PUCCH resource indicator is less than 3 bits;

a field of a PDSCH-to-HARQ feedback timing indicator is less than 3 bits; and a field of a downlink assignment index is less than 2 bits;

the downlink control information having spatial direction indication, and the terminal equipment receiving or transmitting a signal scheduled by the downlink control information according to the spatial direction indication of the downlink control information.

According to a third aspect of the embodiments of this disclosure, there is provided a signal reception or transmission apparatus, configured in a terminal equipment, the apparatus including:

a receiving unit configured to receive downlink control information transmitted by a network device, a field of the downlink control information satisfying at least one of the following conditions that:

if the downlink control information is used for scheduling a downlink signal, a field of frequency-domain resource assignment of the downlink control information is smaller than a field of frequency-domain resource assignment of DCI format 1_0;

if the downlink control information is used for scheduling an uplink signal, a field of frequency-domain resource assignment of the downlink control information is smaller than a field of frequency-domain resource assignment of DCI format 0_0;

a field of time-domain resource assignment is less than 4 bits;

a field of a modulation and coding scheme is less than 5 bits;

a field of HARQ process number is less than 4 bits;

a field of a redundancy version is less than 2 bits;

a field of a PUCCH resource indicator is less than 3 bits;

a field of a PDSCH-to-HARQ feedback timing indicator is less than 3 bits; and a field of a downlink assignment index is less than 2 bits;

a processing unit configured to receive or transmit a signal scheduled by the downlink control information according to spatial direction indication of the downlink control information.

According to a fourth aspect of the embodiments of this disclosure, there is provided a signal reception or transmission apparatus, configured in a network device, the apparatus including:

a transmitting unit configured to transmit downlink control information to a terminal equipment, a field of the downlink control information satisfying at least one of the following conditions that:

if the downlink control information is used for scheduling a downlink signal, a field of frequency-domain resource assignment of the downlink control information is smaller than a field of frequency-domain resource assignment of DCI format 1_0;

if the downlink control information is used for scheduling an uplink signal, a field of frequency-domain resource assignment of the downlink control information is smaller than a field of frequency-domain resource assignment of DCI format 0_0;

a field of time-domain resource assignment is less than 4 bits;

a field of a modulation and coding scheme is less than 5 bits;

a field of the HARQ process number is less than 4 bits;

a field of a redundancy version is less than 2 bits;

a field of a PUCCH resource indicator is less than 3 bits;

a field of a PDSCH-to-HARQ feedback timing indicator is less than 3 bits; and a field of a downlink assignment index is less than 2 bits;

the downlink control information having spatial direction indication, and the terminal equipment receiving or transmitting a signal scheduled by the downlink control information according to the spatial direction indication of the downlink control information.

According to a fifth aspect of the embodiments of this disclosure, there is provided a signal reception or transmission method, applicable to a terminal equipment, the method including:

receiving, by a terminal equipment, downlink control information transmitted by a network device, the downlink control information including a scheduling offset; and receiving a downlink signal scheduled by the downlink control information, or transmitting an uplink signal scheduled by the downlink control information, by the terminal equipment according to spatial direction indication to which the scheduling offset corresponds or according to a pathloss reference signal to which the scheduling offset corresponds;

wherein the scheduling offset and a threshold to which the scheduling offset corresponds are determined based on one of the following subcarrier spacings:

a subcarrier spacing for reception of the downlink control information (a subcarrier spacing for reception of the DCI);

a subcarrier spacing for reception of the downlink signal scheduled by the downlink control information (a subcarrier spacing for reception of the PDSCH scheduled by the DCI); and a subcarrier spacing for transmission of the uplink signal scheduled by the downlink control information (a subcarrier spacing for transmission of the PUSCH scheduled by the DCI).

According to a sixth aspect of the embodiments of this disclosure, there is provided a signal reception or transmission method, applicable a network device, the method including:

transmitting downlink control information by a network device to a terminal equipment, the downlink control information including a scheduling offset, the scheduling offset corresponding to a spatial direction indication or corresponding to a pathloss reference signal, and the downlink control information being used by the terminal equipment to receive a downlink signal scheduled by the downlink control information or transmit an uplink signal scheduled by the downlink control information according to the spatial direction indication to which the scheduling offset corresponds or according to the pathloss reference signal to which the scheduling offset corresponds;

wherein the scheduling offset and a threshold to which the scheduling offset corresponds are determined based on one of the following subcarrier spacings:

a subcarrier spacing for reception of the downlink control information;

a subcarrier spacing for reception of the downlink signal scheduled by the downlink control information; and a subcarrier spacing for transmission of the uplink signal scheduled by the downlink control information.

According to a seventh aspect of the embodiments of this disclosure, there is provided a signal reception or transmission apparatus, configured in a terminal equipment, the apparatus including:

a receiving unit configured to receive downlink control information transmitted by a network device, the downlink control information including a scheduling offset; and a processing unit configured to receive a downlink signal scheduled by the downlink control information, or transmit an uplink signal scheduled by the downlink control information, according to spatial direction indication to which the scheduling offset corresponds or according to a pathloss reference signal to which the scheduling offset corresponds;

wherein, the scheduling offset and a threshold to which the scheduling offset corresponds are determined based on one of the following subcarrier spacings:

a subcarrier spacing for reception of the downlink control information (a subcarrier spacing for reception of the DCI);

a subcarrier spacing for reception of the downlink signal scheduled by the downlink control information (a subcarrier spacing for reception of the PDSCH scheduled by the DCI); and a subcarrier spacing for transmission of the uplink signal scheduled by the downlink control information (a subcarrier spacing for transmission of the PUSCH scheduled by the DCI).

According to an eighth aspect of the embodiments of this disclosure, there is provided a signal reception or transmission apparatus, configured in a network device, the apparatus including:

a transmitting unit configured to transmit downlink control information to a terminal equipment, the downlink control information including a scheduling offset, the scheduling offset corresponding to a spatial direction indication or corresponding to a pathloss reference signal, and the downlink control information being used by the terminal equipment to receive a downlink signal scheduled by the downlink control information or transmit an uplink signal scheduled by the downlink control information according to the spatial direction indication to which the scheduling offset corresponds or according to the pathloss reference signal to which the scheduling offset corresponds;

wherein the scheduling offset and a threshold to which the scheduling offset corresponds are determined based on one of the following subcarrier spacings:

a subcarrier spacing for reception of the downlink control information;

a subcarrier spacing for reception of the downlink signal scheduled by the downlink control information; and a subcarrier spacing for transmission of the uplink signal scheduled by the downlink control information.

According to a ninth aspect of the embodiments of this disclosure, there is provided a terminal equipment, including the apparatus as described in the third or the seventh aspect.

According to a tenth aspect of the embodiments of this disclosure, there is provided a network device, including the apparatus as described in the fourth or the eighth aspect.

According to an eleventh aspect of the embodiments of this disclosure, there is provided a communication system, including the terminal equipment as described in the ninth aspect and the network device as described in the tenth aspect.

According to another aspect of the embodiments of this disclosure, there is provided a computer readable program, which, when executed in a terminal equipment, will cause a computer to carry out the method described in the first or the fifth aspect in the terminal equipment.

According to a further aspect of the embodiments of this disclosure, there is provided a storage medium storing a computer readable program, which will cause a computer to carry out the method described in the first or the fifth aspect in a terminal equipment.

According to yet another aspect of the embodiments of this disclosure, there is provided a computer readable program, which, when executed in a network device, will cause a computer to carry out the method described in the second or the sixth aspect in the network device.

According to still another aspect of the embodiments of this disclosure, there is provided a storage medium storing a computer readable program, which will cause a computer to carry out the method described in the second or the sixth aspect in a network device.

An advantage of the embodiments of this disclosure exists in that according to at least one aspect of the embodiments of this disclosure, the terminal equipment and the network device may transmit or receive corresponding signals by using accurate power and spatial direction, thereby improving reliability of signal reception or transmission.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 3 is a schematic diagram of the signal reception or transmission method of Embodiment 2;

FIG. 4 is a schematic diagram of the signal reception or transmission method of Embodiment 3;

FIG. 5 is a schematic diagram of the signal reception or transmission method of Embodiment 4;

DETAILED DESCRIPTION

Figure 1:
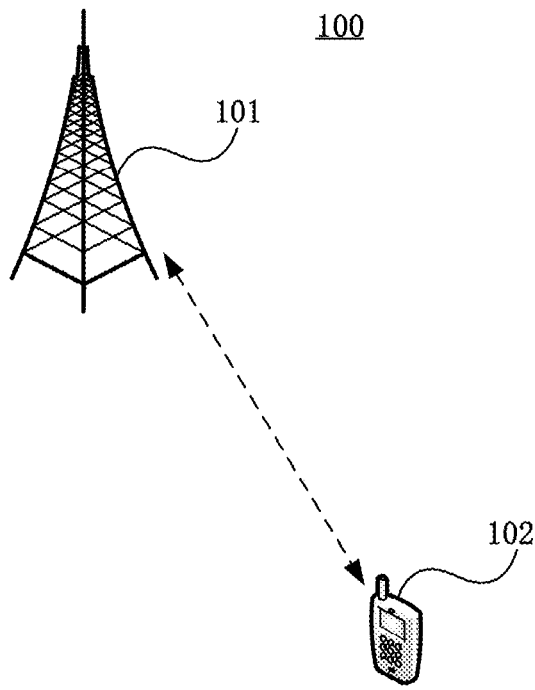
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. For the sake of simplicity, description is given in FIG. 1 by taking one terminal equipment as an example. And the network device 101 may be, for example, a network device gNB in an NR system.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

In the embodiment of this disclosure, the terminal equipment 102 may transmit data to the network device 101 in, for example, a grant-free transmission manner. The network device 101 may receive data transmitted by one or more terminal equipments 102, and feed back information to the terminal equipment 102, such as acknowledgement information (ACK) or non-acknowledgement information (NACK), and the terminal equipment 102 may acknowledge termination of the transmission process according to the feedback information, or may further perform new data transmission, or may perform data retransmission.

In the embodiment of this disclosure, for the sake of explanation, Compact DCI is used to refer to the above control information. In particular, a size of a part of fields of Compact DCI is less than basis control information (such as DCI format 0_0, 0_1, 10, 11) in the NR system. And the size of a part of the fields of Compact DCI is configurable.

In the embodiment of this disclosure, unless otherwise specified, uplink signals include: uplink data signals (such as PUSCHs), sounding reference signals (such as SRS), random access signals (such as PRACHs), etc., and downlink signals include: downlink data signals (such as PDSCHs), downlink control signals (such as PDCCHs), reference signals (such as channel state information reference signals (CSI-RSs)), and synchronization signal blocks (SSBs), etc.

In the embodiment of this disclosure, a scheduling offset refers to a time interval/offset between control information and a signal scheduled by the control information.

For example, for a PDCCH and an uplink data signal (PUSCH) scheduled by the PDCCH, the scheduling offset refers to a time-domain interval/offset between the PDCCH and the PUSCH scheduled by the PDCCH. This time-domain interval/offset may be of a slot level, a symbol level; however, it is not limited thereto.

For another example, for a PDCCH and a downlink data signal (PDSCH) scheduled by the PDCCH, the scheduling offset refers to a time-domain interval/offset between the PDCCH and the PDSCH scheduled by the PDCCH. This time-domain interval/offset may be of a slot level, a symbol level; however, it is not limited thereto.

For a further example, for a PDCCH and an aperiodic channel state information reference signal (CSI-RS) activated by the PDCCH, the scheduling offset refers to a time-domain interval/offset between the PDCCH and the CSI-RS activated by the PDCCH. This time-domain interval/offset may be of a slot level, a symbol level; however, it is not limited thereto.

In addition, since different sizes of scheduling offset may correspond to different behaviors of the terminal equipment, a threshold corresponding to the scheduling offset is needed to distinguish the behaviors of the terminal equipment. A size of the threshold may be determined according to a terminal capability reported by the terminal equipment to the network device.

For example, for a downlink signal, the threshold may be a shortest time from receiving downlink control data (PDCCH) by the terminal equipment to applying spatial QCL information indicated by the downlink control data to the downlink signal (such as a PDSCH) scheduled by the PDCCH. The time may be an absolute time, such as 2 ms, or may be in units of symbols or slots, and may be related to a subcarrier spacing. For example, the terminal equipment may indicate a value of a minimum number of OFDM symbols with each subcarrier spacing of 60 kHz and 120 kHz as the above threshold. For 60 kHz, the threshold may be 7, 14 or 28 symbols, and for 120 kHz, the threshold may be 14 or 28 symbols.

For example, for an uplink signal, the threshold may be a shortest time from receiving downlink control data (PDCCH) by the terminal equipment to applying spatial QCL information indicated by the downlink control data to the uplink signal (such as a PUSCH) scheduled by the PDCCH. The time may be an absolute time, such as 2 ms, or may be in units of symbols or slots, and may be related to a subcarrier spacing. For example, the terminal equipment may indicate a value of a minimum number of OFDM symbols with each subcarrier spacing of 60 kHz and 120 kHz as the above threshold. For 60 kHz, the threshold may be 7, 14 or 28 symbols, and for 120 kHz, the threshold may be 14 or 28 symbols.

In the embodiment of this disclosure, the above threshold is hereinafter also referred to as a predetermined threshold.

Various implementations of the embodiments of this disclosure will be described below with reference to the accompanying drawings. These implementations are exemplary only, and are not intended to limit this disclosure.

Embodiment 1

Figure 2:
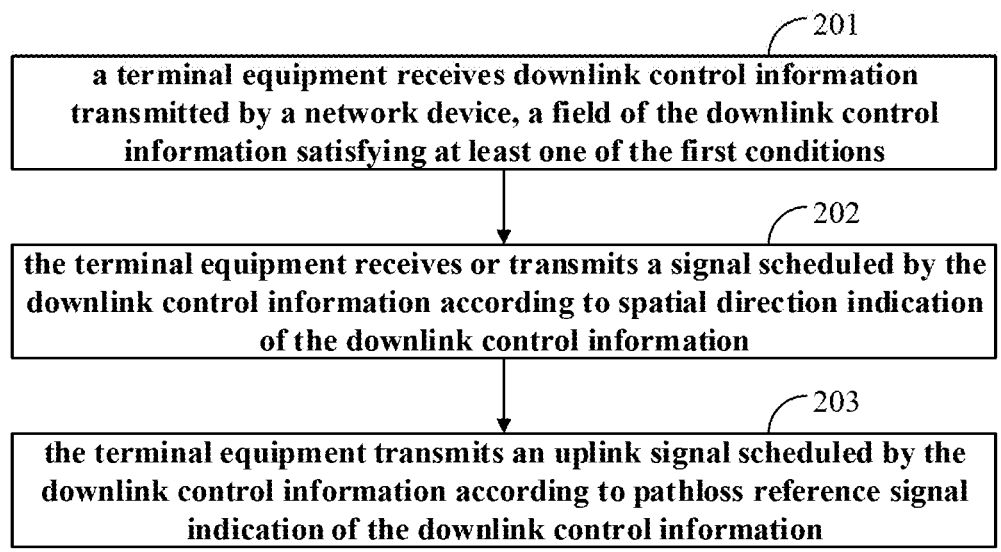
FIG. 2 is a schematic diagram of the signal reception or transmission method of Embodiment 1.

The embodiment of this disclosure provides a signal reception or transmission method, applicable to a terminal equipment. FIG. 2 is a schematic diagram of the signal reception or transmission method of this embodiment. Referring to FIG. 2, the method includes: step 201: a terminal equipment receives downlink control information transmitted by a network device, a field of the downlink control information satisfying at least one of the following conditions (referred to as first conditions) that: if the downlink control information is used for scheduling a downlink signal, a field of frequency-domain resource assignment of the downlink control information is smaller than a field of frequency-domain resource assignment of DCI format 1_0; if the downlink control information is used for scheduling an uplink signal, a field of frequency-domain resource assignment of the downlink control information is smaller than a field of frequency-domain resource assignment of DCI format 0_0; a field of time-domain resource assignment is less than 4 bits; a field of a modulation and coding scheme is less than 5 bits; a field of HARQ process number is less than 4 bits; a field of a redundancy version is less than 2 bits; a field of a PUCCH resource indicator is less than 3 bits; a field of a PDSCH-to-HARQ feedback timing indicator is less than 3 bits; and a field of a downlink assignment index is less than 2 bits; and step 202: the terminal equipment receives or transmits a signal scheduled by the downlink control information according to spatial direction indication of the downlink control information.

In this embodiment, the downlink control information is the above-described Compact DCI, which may be a new DCI format, such as DCI format 0_2 or DCI format 1_2, DCI format 0_2 being used to schedule uplink data (PUSCH), and DCI format 1_2 being used to schedule downlink data (PDSCH). As described above, the size of a part of fields of the Compact DCI may be less than the basic control information in the NR system, and the terminal equipment may receive or transmit the signal scheduled by the downlink control information according to the spatial direction indication of the downlink control information. Hence, the terminal equipment and network device may receive or transmit corresponding signals by using an accurate spatial direction, thereby improving reliability of signal reception or transmission.

In this embodiment, the field of the frequency-domain resource assignment is used to indicate a frequency-domain position of the signal scheduled by the downlink control information; the field of the time-domain resource assignment is used to indicate a time-domain position of the data scheduled by the downlink control information; the field of a modulation and coding scheme is used to indicate a modulation scheme and code rate used by the signal scheduled by the downlink control information; the field of the HARQ process number is used to indicate an HARQ process to which the signal scheduled by the downlink control information corresponds; the field of a redundancy version is used to indicate a redundancy version to which the signal scheduled by the downlink control information corresponds; the field of a PUCCH resource indicator is used to indicate a PUCCH resource associated with HARQ feedback to which the signal scheduled by the downlink control information corresponds; the field of a PDSCH-to-HARQ feedback timing indicator is used to indicate a time-domain interval between the signal scheduled by the downlink control information and the HARQ feedback to which the signal corresponds; and the field of a downlink assignment index indicates a cumulative number of pairs of a serving cell and a PDCCH monitoring occasion, wherein PDSCH reception or SPS PDSCH release associated with DCI used for PDSCH scheduling exists in the pairs of a serving cell and a PDCCH monitoring occasion. Reference may be made to the related art for particular meanings of these fields, description of which being omitted here.

In this embodiment, as shown in FIG. 2, the method may further include:

step 203: the terminal equipment transmits an uplink signal scheduled by the downlink control information according to pathloss reference signal indication of the downlink control information.

In this embodiment, the terminal equipment transmits the uplink signal scheduled by the downlink control information according to the pathloss reference signal indication of the downlink control information, and the terminal equipment may transmit corresponding signals by using accurate power, thereby improving reliability of signal transmission.

In this embodiment, there is no restriction on an order of executing step 202 and step 203, and according to scheduling of uplink signal and/or downlink signal, step 202 may be executed first and then step 203, or step 203 may be executed before step 202, or step 202 and step 203 may be executed synchronously.

In this embodiment, in one implementation of step 202, the signal scheduled by the downlink control information is a downlink signal, such as the above-described PDSCH, CSI-RS, and SSB, etc., and the above spatial direction indication is a QCL assumption for the downlink signal, or an indication of a TCJ (transmission configuration indicator) state of the downlink signal.

In this implementation, if the downlink control information contains no TCJ field and the scheduling offset to which the downlink control information corresponds is greater than or equal to the predetermined threshold, the terminal equipment may receive the downlink signal according to one of the following QCL assumptions or TCJ states:

a TCJ state or a QCL assumption to which a control resource set (CORESET) corresponds, the control resource set (CORESET) corresponding to the reception of the downlink control information;

a TCJ state or a QCL assumption to which a default control resource set (CORESET) corresponds; and a default TCJ status used for downlink signal indication.

In this implementation, the above default CORESET is, for example, CORESET #0, or a CORESET with a minimal ID on an active BWP of a cell where the downlink control information is received; however, this embodiment is not limited thereto.

In this implementation, the above default TCI state used for downlink signal indication is, for example, a first entry of one or more entries used for indicating TCI states of the downlink signal configured by higher-layer signaling and/or activated by MAC signaling. For example, the higher-layer signaling refers to RRC signaling tci-StatesToAddModList, which configures multiple TCI states for the downlink signal (such as a PDSCH). The above default TCI state may be a first one of TCI states indicated in the RRC signaling tci-StatesToAddModList. In addition, MAC-CE signaling may activate a part of the TCI states indicated by tci-StatesToAddModList, and the above default TCI state may a first one of the TCI states activated by the above MAC-CE signaling. What described above are examples only, and this embodiment is not limited thereto.

In this implementation, if the downlink control information contains a TCI field and the scheduling offset to which the downlink control information corresponds is greater than or equal to the above predetermined threshold, the terminal equipment may receive the downlink signal according to the TCI state indicated by the TCI field.

For example, code points of the TCI field are mapped one-to-one with the first $2^N$ TCI states in the TCI states activated by MAC CE signaling, where, N is the number of bits of the TCI field, and N>0. For example, assuming that a size of the TCI field is 2 bits, the TCI field has four code points, namely, '00', '01', '10', and '11'. If 8 TCI states are activated by the MAC-CE and are in an order of TCI #0, TCI #1, . . . , TCI #7 from the first to the last, a mapping relation between the TCI field and the above 8 TCI states is: '00'→TCI #0, '01'→TCI #1, '10'→TCI #2, '11'→TCI #3. When the TCI field in the DCI is '00', the terminal equipment receives the downlink signal according to TCI #0. Therefore, the terminal equipment may determine the TCI state indicated by the TCI field according to the mapping relation, and receive the downlink signal according to the TCI state.

For another example, the mapping relation between the code points of the TCI field and the TCI states activated by the MAC CE signaling is determined according to RRC signaling. For example, assuming that the size of the TCI field is 2 bits, the TCI field has four code points, namely, '00', '01', '10', and '11'. Assuming that the 8 TCI states activated by the MAC-CE are in an order of TCI #0, TCI #1, ..., TCI #7 from the first to the last. If '00'→TCI #3, '01'→TCI #5, '10'→TCI #7 and '11'→TCI #1 are configured in the RRC signaling, when the TCI field of DCI is '00', the terminal equipment receives the downlink signal according to TCI #3. In addition, the indication information to which code points '00', '01', '10' and '11' correspond may be 0, 1, 2 and 3 respectively in the RRC signaling, and indication information to which TCI states TCI #0, TCI #1, ..., TCI #7 correspond is 0, 1, ..., 7 respectively in the RRC signaling. Therefore, the terminal equipment may determine the mapping relation according to the RRC signaling, determine the TCI state indicated by the TCI field according to the mapping relation, and receive the downlink signal according to the TCI state.

In this implementation, if the scheduling offset to which the downlink control information corresponds is less than the above predetermined threshold, no matter whether the downlink control information contains the above TCI field, the terminal equipment may receive the downlink signal according to the default TCI state or QCL assumption.

For example, the default TCI state or QCL assumption is identical to a TCI state or QCL assumption of a CORESET with a minimal ID in the latest slot, the CORESET is associated with a monitored search space in the latest slot, and the CORESET is located on an active BWP of a current serving cell.

In this implementation, the scheduling offset and the predetermined threshold may be determined based on one of the following subcarrier spacings:
  a subcarrier spacing for reception of the downlink control information (the subcarrier spacing for the reception of the DCI); and
  a subcarrier spacing for reception of a downlink signal scheduled by the downlink control information (the subcarrier spacing for the reception of the PDSCH scheduled by the DCI).

In this implementation, as the subcarrier spacing on which the scheduling offset and the predetermined threshold are based is specified, a problem of ambiguity in behaviors of the terminal equipment in performing corresponding operations is avoided.

In this embodiment, in another implementation of step 202, the signal scheduled by the downlink control information is an uplink signal, such as the above-described PUSCH, SRS, and PRACH, etc., and the above spatial direction indication is an indication of a spatial relation of the uplink signal.

In this implementation, if the downlink control information contains no spatial relation indicator (SRI) field, the terminal equipment may transmit the uplink signal according to one of the following spatial relations or spatial domain filter:
  a spatial relation of a default physical uplink control channel (PUCCH) resource;
  a spatial relation to which a default sounding reference signal (SRS) resource correspond; and
  a spatial domain filter used for receiving the downlink control information.

In this implementation, the above default PUCCH resource may be a PUCCH resource with a minimal ID on an active UL BWP of a cell where the uplink signal is transmitted; however, this embodiment is not limited thereto.

In this implementation, the above default SRS resource is, for example, an SRS resource with a minimal ID in an SRS resource set; however, this embodiment is not limited thereto. Here, the SRS resource set may be an SRS resource set associated with the transmission of the above uplink signal, such as an SRS resource set used for corresponding PUSCH transmission.

In this implementation, if the downlink control information contains an SRI field, the terminal equipment may transmit the uplink signal according to the spatial relation associated with the SRS resource indicated by the SRI field.

For example, code points of the SRI field are mapped one-to-one with the first $2^N$ SRS resources in a SRS resource set associated with transmission of the uplink signal; where, N is the number of bits of the SRI field, N>0. Hence, the terminal equipment may determine the SRS resource indicated by the SRI field according to the mapping relation, and transmit the uplink signal according to a spatial relation associated with the SRS resource.

For another example, the mapping relation between the code points of the SRI field and the SRS resources in the SRS resource set associated with the transmission of the uplink signal is determined according to RRC signaling. Thus, the terminal equipment may determine the mapping relation according to the RRC signaling, determine the SRS resource indicated by the SRI field according to the mapping relation, and then transmit the uplink signal according to the spatial relation associated with the SRS resource.

In this embodiment, in another implementation of step 202, the signal scheduled by the downlink control information is an uplink signal, such as the above PUSCH, SRS, and PRACH, etc., and the above spatial direction indication is an indication of the spatial relation of the uplink signal.

In this implementation, if the downlink control information contains no SRI (spatial relation indicator) field and the scheduling offset to which the downlink control information corresponds is greater than or equal to a predetermined threshold, the terminal equipment may transmit the uplink signal according to one of the following spatial relations or spatial domain filter:
  a spatial relation of a default physical uplink control channel (PUCCH) resource;
  a spatial relation to which a default sounding reference signal (SRS) resource corresponds; and
  a spatial domain filter used for receiving the downlink control information.

In this implementation, the above default PUCCH resource may be a PUCCH resource with a minimal ID in an activated UL BWP of the cell where the uplink signal is transmitted; however, this embodiment is not limited thereto.

In this implementation, the above default SRS resource is, for example, an SRS resource with a minimal ID in a SRS resource set; however, this embodiment is not limited thereto. Here, the SRS resource set may be an SRS resource set associated with transmission of the above uplink signal, such as an SRS resource set used for corresponding PUSCH transmission.

In this implementation, if the downlink control information contains an SRI field and the scheduling offset to which the downlink control information corresponds is greater than or equal to the predetermined threshold, the terminal equipment may transmit the uplink signal according to the spatial relation corresponding to the SRS resource indicated by the SRI field.

For example, the code points of the SRI field are mapped one-to-one with the first $2^N$ SRS resources in the SRS resource set associated with the transmission of the uplink signal; where, N is the number of bits of the SRI field, N>0.

For example, assuming that the size of the SRI field is 2 bits, the SRI field has four code points, namely, '00', '01', '10', and '11'. If there are 8 SRS resources in the SRS resource set which are in an order of SRS #0, SRS #1, . . . , SRS #7 from the first to the last, a mapping relation between the SRI field and the above 8 SRS resources is: '00'→SRS #0, '01'→SRS #1, '10'→SRS #2 and '11'→SRS #3. When the SRI field of DCI is '00', the terminal equipment transmits the uplink signal according to SRS #0. Therefore, the terminal equipment may determine the SRS resource indicated by the SRI field according to the mapping relation, and transmits the uplink signal according to the spatial relation associated with the SRS resource.

For another example, the mapping relation between the code points of the SRI field and the SRS resources in the SRS resource set associated with the transmission of the uplink signal is determined according to RRC signaling. For example, assuming that the size of the SRI field is 2 bits, the SRI field has four code points, namely, '00', '01', '10', and '11'. Assuming that there are 8 SRS resources in the SRS resource set and are in an order of SRS #0, SRS #1, . . . , SRS #7 from the first to the last. If '00'→SRS #3, '01'→SRS #5, '10'→SRS #7 and '11'→SRS #1 are configured in the RRC signaling, when the SRI field of DCI is '00', the terminal equipment transmits the uplink signal according to SRS #3. In addition, the indication information to which code points '00', '01', '10' and '11' correspond may be 0, 1, 2 and 3 respectively in the RRC signaling, and indication information to which SRS resources SRS #0, SRS #1, . . . , SRS #7 correspond is 0, 1, . . . , 7 respectively in the RRC signaling. Therefore, the terminal equipment may determine the mapping relation according to the RRC signaling, determine the SRS resource indicated by the SRI field according to the mapping relation, and transmit the uplink signal according to the spatial relation associated with the SRS resource.

In this implementation, if the scheduling offset to which the downlink control information corresponds is less than the predetermined threshold, no matter whether the downlink control information contains the above SRI field, the terminal equipment may transmit the uplink signal according to the space relation or spatial domain filter to which the latest uplink transmission corresponds. The uplink transmission may be at least one of the following uplink signals: a PUSCH, a PUCCH, an SRS, and a PRACH; however, this embodiment is not limited thereto, for example, the uplink transmission may also only include a PUSCH and/or a PUCCH.

In this implementation, the scheduling offset and the predetermined threshold may be determined based on one of the following subcarrier spacings:
  a subcarrier spacing for reception of the downlink control information (the subcarrier spacing for the reception of the DCI); and
  a subcarrier spacing for reception of the uplink signal scheduled by the downlink control information (the subcarrier spacing for the reception of PUSCH scheduled by the DCI).

In this implementation, as the subcarrier spacing on which the scheduling offset and the predetermined threshold are based is specified, a problem of ambiguity in behaviors of the terminal equipment in performing corresponding operations is avoided.

In this embodiment, in one implementation of step 203, if the downlink control information contains no SRI field, or the downlink control information contains an SRI field but a mapping relation between an SRI and a corresponding pathloss reference signal is not configured, if the spatial relation is applicable, the pathloss reference signal may be one of the following: a spatial relation reference signal to which a default physical uplink control channel (PUCCH) resource corresponds, a spatial relation reference signal to which a default sounding reference signal (SRS) resource corresponds, and a reference signal related to a TCI state or a QCL assumption to which the downlink control information corresponds, thus the terminal equipment may transmit the uplink signal scheduled by the downlink control information according to the above reference signal, and if the spatial relation is not applicable, the pathloss reference signal may be a default pathloss reference signal, thus the terminal equipment may transmit the uplink signal scheduled by the downlink control information according to the default reference signal.

In this implementation, the above default PUCCH resource is, for example, a PUCCH resource with a minimal ID on an active UL BWP of a cell to which the uplink signal corresponds (the cell where the uplink signal is transmitted); however, this embodiment is not limited thereto.

In this implementation, the above default SRS resource is, for example, an SRS resource with a minimal ID in a SRS resource set; however, this embodiment is not limited thereto. Here, the SRS resource set may be an SRS resource set associated with the transmission of the above uplink signal, such as an SRS resource set used for corresponding PUSCH transmission.

In this implementation, the above default pathloss reference signal is, for example, a reference signal with id=0; however, this embodiment is not limited thereto.

In this implementation, if the downlink control information contains an SRI field and a mapping relation between an SRI and a corresponding pathloss reference signal is configured, the terminal equipment may transmit the uplink signal according to the pathloss reference signal indicated by the SRI field.

For example, a mapping relation between the code points of the SRI field and the pathloss reference signal is determined according to RRC signaling. For example, assuming that the size of the SRI field is 2 bits, the SRI field has four code points, namely, '00', '01', '10', and '11'. Assuming that there are 8 pathloss reference signals and are in an order of PL-RS #0, PL-RS #1, . . . , PL-RS #7 from the first to the last. If '00'→PL-RS #3, '01'→PL-RS #5, '10'→PL-RS #7 and '11'→PL-RS #1 are configured in the RRC signaling, when the SRI field of DCI is '00', the terminal equipment transmits the uplink signal according to PL-RS #3. In addition, the indication information to which code points '00', '01', '10' and '11' correspond may be 0, 1, 2 and 3 respectively in the RRC signaling, and indication information to which pathloss reference signals PL-RS #0, PL-RS #1, . . . , PL-RS #7 correspond is 0, 1, . . . , 7 respectively in the RRC signaling. Therefore, the terminal equipment may determine the mapping relation according to the RRC signaling, determine the pathloss reference signal indicated by the SRI field according to contents indicated by the SRI field and the mapping relation between an SRI and a corresponding pathloss reference signal, and transmit the uplink signal according to the pathloss reference signal.

In this embodiment, in another implementation of step 203, if the downlink control information contains no SRI field, or if the downlink control information contains an SRI field but the mapping relation between an SRI and a corresponding pathloss reference signal is not configured,
  if the spatial relation is applicable and the scheduling offset is greater than or equal to the predetermined threshold, the pathloss reference signal may be one of the following: a spatial relation reference signal to which a default physical uplink control channel (PUCCH) resource corresponds, a spatial relation reference signal to which a default sounding reference signal (SRS) resource corresponds, and a reference signal related to a TCI state or a QCL assumption to which the downlink control information corresponds, thus the terminal equipment may transmit the uplink signal schedule by the downlink control information according to the above reference signal, on the other hand, if the spatial relation is applicable but the scheduling offset is less than the predetermined threshold, the pathloss reference signal may be a reference signal related to the spatial relation or spatial domain filter of the latest uplink transmission, thus the terminal equipment may transmit the uplink signal schedule by the downlink control information according to the above reference signal, and if the spatial relation is not applicable, the pathloss reference signal may be a default pathloss reference signal, thus the terminal equipment may transmit the uplink signal schedule by the downlink control information according to the default pathloss reference signal.

In this implementation, the above default PUCCH resource is, for example, a PUCCH resource with a minimal ID on an active UL BWP of a cell to which the uplink signal corresponds (the cell where the uplink signal is transmitted); however, this embodiment is not limited thereto.

In this implementation, the above default SRS resource is, for example, an SRS resource with a minimal ID in a SRS resource set; however, this embodiment is not limited thereto. Here, the SRS resource set may be an SRS resource set associated with the transmission of the above uplink signal, such as an SRS resource set used for corresponding PUSCH transmission.

In this implementation, the above uplink transmission may be at least one of the following uplink signals: a PUSCH, a PUCCH, an SRS and a PRACH; however, this embodiment is not limited thereto, for example, the uplink transmission may also only include a PUSCH and/or a PUCCH.

In this implementation, the above default pathloss reference signal is, for example, a reference signal with id=0; however, this embodiment is not limited thereto.

In this implementation, if the downlink control information contains an SRI field and the mapping relation between an SRI and a corresponding pathloss reference signal is configured, the terminal equipment may transmit the uplink signal according to the pathloss reference signal indicated by the SRI field.

For example, a mapping relation between the code points of the SRI field and the pathloss reference signal is determined according to RRC signaling. For example, assuming that the size of the SRI field is 2 bits, the SRI field has four code points, namely, '00', '01', '10', and '11'. Assuming that there are 8 pathloss reference signals and are in an order of PL-RS #0, PL-RS #1, . . . , PL-RS #7 from the first to the last. If '00'→PL-RS #3, '01'→PL-RS #5, '10'→PL-RS #7 and '11'→PL-RS #1 are configured in the RRC signaling, when the SRI field of DCI is '00', the terminal equipment transmits the uplink signal according to PL-RS #3. In addition, the indication information to which code points '00', '01', '10' and '11' correspond may be 0, 1, 2 and 3 respectively in the RRC signaling, and indication information to which pathloss reference signals PL-RS #0, PL-RS #1, . . . , PL-RS #7 correspond is 0, 1, . . . , 7 respectively in the RRC signaling. Therefore, the terminal equipment may determine the mapping relation according to the RRC signaling, determine the pathloss reference signal indicated by the SRI field according to contents indicated by the SRI field and the mapping relation between an SRI and a corresponding pathloss reference signal, and transmit the uplink signal according to the pathloss reference signal.

In this implementation, the scheduling offset and the predetermined threshold may be determined based on one of the following subcarrier spacings:

a subcarrier spacing for reception of the downlink control information (the subcarrier spacing for the reception of the DCI); and a subcarrier spacing for reception of the uplink signal scheduled by the downlink control information (the subcarrier spacing for the reception of PUSCH scheduled by the DCI).

In this implementation, as the subcarrier spacing on which the scheduling offset and the predetermined threshold are based is specified, a problem of ambiguity in behaviors of the terminal equipment in performing corresponding operations is avoided.

In this embodiment, the spatial relation being applicable may refer to that the pathloss reference signal is configured with a spatial relation or configured with a TCI state associated with QCL Type D. For example, the above default physical uplink control channel (PUCCH) resource is configured with a reference signal used to represent a spatial relation (UE is provided a spatial setting by PUCCH-Spatialrelationinfo for the default PUCCH resource); for another example, the above default sounding reference signal (SRS) resource is configured with a reference signal used to represent a spatial relation (UE is provided a spatial setting by SRS-Spatialrelationinfo for the default PUCCH resource). In this embodiment, the spatial relation being applicable may also refer to that the TCI state or QCL assumption to which the downlink control information corresponds is associated with QCL Type D, that is, the TCI state associated with the downlink control signal is configured with the reference signal of QCL Type D, hence, it is deemed that the spatial relation is applicable. In other words, taking a PUCCH as an example, only when the PUCCH is configured with a reference signal used to represent a spatial relation, the PUCCH may be selected as a pathloss reference signal. The above description is given by taking a PUCCH as an example only, and situations are similar for other signals.

In this embodiment, the spatial relation being not applicable refers to that the above pathloss reference signal is not configured with a spatial relation or a TCI state associated with QCL Type D.

In this implementation, as described above, the size of a part of the fields of the downlink control information (Compact DCI) is configurable. For example, the number of bits to which at least one of the following fields of the downlink control information corresponds is configurable:

an antenna port;
a transmission configuration indication;
a rate matching indicator;
an SRS request;
a PRB bundling size indicator;
a carrier indicator;
a CSI request;
ZP CSI-RS triggering;

a Beta (β) offset indicator;
an SRS resource indicator;
a repetition factor; and
priority indication.

In the above description, the antenna port is used to indicate an antenna port associated with a signal scheduled by the downlink control information, and the number of its bits may be configurable, for example, it may be configured in a range of 0 to 2 bits or smaller; the transmission configuration indication is used to indicate a QCL assumption managed by a downlink signal scheduled by the downlink control information, and the number of its bits may be configurable, for example, it may be configured in the range of 0 to 3 or smaller; the rate matching indicator is used to indicate which time-frequency resources are avoided by a signal scheduled by the downlink control information, and the number of its bits may be configurable, for example, it may be configured in a range of 0 to 2 bits or smaller; the SRS request is used to trigger transmission of aperiodic SRS resources, and the number of its bits may be configurable, for example, it may be configured in the range of 0 to 3 or smaller; the PRB bundling size indicator is used to indicate precoding granularity of a signal scheduled by the downlink control information, and the number of its bits may be configurable, for example, it may be configured in the range of 0 to 1 or smaller; the carrier indicator is used to indicate a cell where a signal scheduled by the downlink control information is located, and the number of its bits may be configurable, for example, it may be configured in the range of 0 to 3 or smaller; the CSI request is used to trigger transmission of an aperiodic CSI report, and the number of its bits may be configurable, for example, it may be configured in the range of 0 to 3 or smaller; the ZP CSI-RS triggering is used to trigger a zero-power CSI-RS, and the number of its bits may be configurable, for example, it may be configured in the range of 0 to 2 or smaller; the Beta (β) offset indicator is used to indicate uplink multiplexing information, i.e. sizes or proportions of time-frequency resources occupied by the multiplexing information (UCI), and the number of its bits may be configurable, for example, it may be configured in the range of 0 to 2 or smaller; the SRS resource indicator is used to indicate SRS resources associated with a signal scheduled by the downlink control information, and the number of its bits may be configurable, for example, it may be configured in the range of 0 to 4 or smaller; the repetition factor is used to indicate the number of repetitions of a signal scheduled by the downlink control information, and the number of its bits may be configurable, for example, it may be configured in the range of 0 to 2 or smaller; and the priority indication is used to indicate a priority of a signal scheduled by the downlink control information, and the number of its bits may be configurable, for example, it may be configured in the range of 0 to 3 or smaller. Reference may be made to the related art for particular meanings of the fields, which shall not be described herein any further.

According the embodiment of this disclosure, the terminal equipment and the network device may transmit or receive corresponding signals by using accurate power and spatial direction, thereby improving reliability of signal reception or transmission.

Embodiment 2

The embodiment of this disclosure provides a signal reception or transmission method, applicable to a network device, which is processing at a network device side corresponding to the method of Embodiment 1, with contents identical to those in Embodiment 1 being not going to be described herein any further.

FIG. 3 is a schematic diagram of the signal reception or transmission method of this embodiment. As shown in FIG. 3, the method includes:

step 301: a network device transmits downlink control information to a terminal equipment, a field of the downlink control information satisfying at least one of first conditions, the first conditions having been described in detail in Embodiment 1, the contents of which being incorporated herein, and being not going to be described herein any further.

In one implementation, the downlink control information includes a spatial direction indication, and the terminal equipment may receive or transmit a signal scheduled by the downlink control information according to the spatial direction indication.

For example, the signal scheduled by the downlink control information is a downlink signal, and the spatial direction indication is an indication of a QCL assumption or TCI state of the downlink signal.

For another example, the signal scheduled by the downlink control information is an uplink signal, and the spatial direction indication is an indication of a spatial relation of the uplink signal.

In another implementation, the downlink control information includes a pathloss reference signal indication, and the terminal equipment may transmit the uplink signal scheduled by the downlink control information according to the pathloss reference signal indication.

In this embodiment, the number of bits to which at least one field of the downlink control information corresponds is configurable, details being as described in Embodiment 1, and being not going to be described herein any further.

According the embodiment of this disclosure, the terminal equipment and the network device may transmit or receive corresponding signals by using accurate power and spatial direction, thereby improving reliability of signal reception or transmission.

Embodiment 3

The embodiment of this disclosure provides a signal reception or transmission method, applicable to a terminal equipment. FIG. 4 is a schematic diagram of the signal reception or transmission method of this embodiment. Referring to FIG. 4, the method includes: step 401: a terminal equipment receives downlink control information transmitted by a network device, the downlink control information including a scheduling offset; and step 402: the terminal equipment receives a downlink signal scheduled by the downlink control information, or transmits an uplink signal scheduled by the downlink control information, according to spatial direction indication to which the scheduling offset corresponds or according to a pathloss reference signal to which the scheduling offset corresponds.

In this embodiment the scheduling offset and a threshold to which the scheduling offset corresponds are determined based on one of the following subcarrier spacings:

a subcarrier spacing for reception of the downlink control information (the subcarrier spacing for the reception of the DCI);

a subcarrier spacing for reception of the downlink signal scheduled by the downlink control information (the subcarrier spacing for the reception of the PDSCH scheduled by the DCI); and a subcarrier spacing for transmission of the uplink signal scheduled by the downlink control information (the subcarrier spacing for the transmission of the PUSCH scheduled by the DCI).

Thus, as the subcarrier spacing on which the scheduling offset and the threshold to which the scheduling offset corresponds are based is specified, a problem of ambiguity in behaviors of the terminal equipment in performing corresponding operations is avoided, and reliability of signal reception and transmission is improved.

Embodiment 4

The embodiment of this disclosure provides a signal reception or transmission method, applicable to a network device, which is processing at a network device side corresponding to the method of Embodiment 3, with contents identical to those in Embodiment 3 being not going to be described herein any further.

FIG. 5 is a schematic diagram of the signal reception or transmission method of this embodiment. Referring to FIG. 5, the method includes:

step 501: a network device transmits downlink control information to a terminal equipment, the downlink control information including a scheduling offset, the scheduling offset corresponding to a spatial direction indication or corresponding to a pathloss reference signal, and the downlink control information being used by the terminal equipment to receive a downlink signal scheduled by the downlink control information or transmit an uplink signal scheduled by the downlink control information according to the spatial direction indication to which the scheduling offset corresponds or according to the pathloss reference signal to which the scheduling offset corresponds.

In this embodiment, as described in Embodiment 3, the scheduling offset and a threshold to which the scheduling offset corresponds are determined based on one of the following subcarrier spacings:

a subcarrier spacing for reception of the downlink control information;

a subcarrier spacing for reception of the downlink signal scheduled by the downlink control information; and a subcarrier spacing for transmission of the uplink signal scheduled by the downlink control information.

Thus, as the subcarrier spacing on which the scheduling offset and the threshold to which the scheduling offset corresponds are based is specified, a problem of ambiguity in behaviors of the terminal equipment in performing corresponding operations is avoided, and reliability of signal reception and transmission is improved.

Embodiment 5

The embodiment of this disclosure provides a signal reception or transmission apparatus, configured in a terminal equipment. As principles of the apparatus for solving problems are similar to that of the method of Embodiment 1, reference may be made to the implementation of the method of Embodiment 1 for implementation of this apparatus, with identical parts being not going to be described herein any further.

Figure 6:
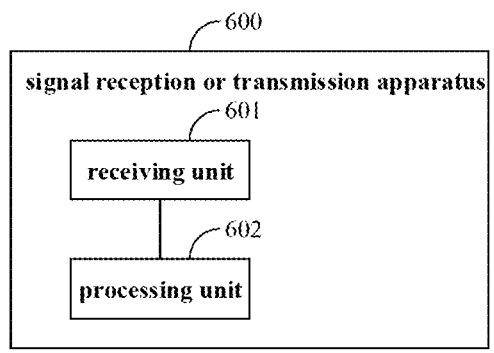
FIG. 6 is a schematic diagram of the signal reception or transmission apparatus of Embodiment 5.

FIG. 6 is a schematic diagram of a signal reception or transmission apparatus 600 of this embodiment. As shown in FIG. 6, the apparatus 600 includes a receiving unit 601 and a processing unit 602. The receiving unit 601 is configured to receive downlink control information transmitted by a network device, a field of the downlink control information satisfying at least one of first conditions, the first conditions having been described in detail in Embodiment 1, the contents of which being incorporated herein, and being not going to be described herein any further. And the processing unit 602 is configured to receive or transmit a signal scheduled by the downlink control information according to spatial direction indication of the downlink control information.

In one implementation, the signal scheduled by the downlink control information is a downlink signal, and the spatial direction indication is indication of a QCL assumption or transmission configuration indication (TCI) state of the downlink signal, then, if the downlink control information contains no TCI field and a scheduling offset is greater than or equal to a predetermined threshold, the processing unit 602 may receive the downlink signal according to one of the following QCL assumptions or TCI states:

a TCI state or a QCL assumption to which a control resource set (CORESET) corresponds, the control resource set (CORESET) corresponding to the reception of the downlink control information;

a TCI state or a QCL assumption to which a default control resource set (CORESET) corresponds; and a default TCI state used for downlink signal indication;

if the downlink control information contains a TCI field and a scheduling offset is greater than or equal to a predetermined threshold, the processing unit 602 may receive the downlink signal according to the TCI state indicated by the TCI field;

and if a scheduling offset is less than a predetermined threshold, the processing unit 602 may receive the downlink signal according to a default TCI state or QCL assumption.

In this implementation, the scheduling offset and the predetermined threshold may be determined based on one of the following subcarrier spacings:

a subcarrier spacing for reception of the downlink control information (the subcarrier spacing for the reception of the DCI); and a subcarrier spacing for reception of a downlink signal scheduled by the downlink control information (the subcarrier spacing for the reception of the PDSCH scheduled by the DCI).

In this implementation, the above default TCI state used for downlink signal indication may be a first entry of one or more entries used for indicating TCI states of the downlink signal configured and/or activated by higher-layer signaling.

In this implementation, if the downlink control information contains a TCI field, then, code points of the TCI field may be mapped one-to-one with the first $2^N$ TCI states in TCI states activated by MAC CE signaling; where, N is the number of bits of the TCI field, N>0;

or, a mapping relation between code points of the TCI field and TCI states activated by MAC CE signaling may be determined according to RRC signaling.

In this implementation, the default TCI state or QCL assumption is identical to a TCI state or QCL assumption of a CORESET with a minimal ID in the latest slot, wherein the CORESET is associated with a monitored search space in the latest slot, and the CORESET is located on an active BWP of a current serving cell.

In another implementation, the signal scheduled by the downlink control information is an uplink signal, and the spatial direction indication is indication of a spatial relation of the uplink signal, then, if the downlink control information contains no SRI field, the processing unit 602 may transmit the uplink signal according to one of the following spatial relations or a spatial domain filter: a spatial relation of a default physical uplink control channel (PUCCH) resource; a spatial relation to which a default sounding reference signal (SRS) resource corresponds; and a spatial domain filter used for receiving the downlink control information;

and if the downlink control information contains an SRI field, the processing unit 602 may transmit the uplink signal according to a spatial relation associated with SRS resources indicated by the SRI field.

In this implementation, the above default PUCCH resource may be a PUCCH resource with a minimal ID on an active UL BWP of a cell where the uplink signal is transmitted.

In this implementation, the above default SRS resource may be an SRS resource with a minimal ID in an SRS resource set, and the SRS resource set may be an SRS resource set associated with transmission of the uplink signal.

In this implementation, if the downlink control information contains an SRI field, then, the code points of the SRI field may be mapped one-to-one with the first $2^N$ SRS resources in the SRS resource set associated with the transmission of the uplink signal; where, N is the number of bits of the SRI field, N>0;

or, a mapping relation between the code points of the SRI field and SRS resources in the SRS resource set associated with the transmission of the uplink signal may be determined according to the RRC signaling.

In another implementation, the signal scheduled by the downlink control information is an uplink signal, and the above spatial direction indication is an indication of the spatial relation of the uplink signal, then, if the downlink control information contains no SRI field and a scheduling offset is greater than or equal to a predetermined threshold, the processing unit 602 may transmit the uplink signal according to one of the following spatial relations or spatial domain filters: a spatial relation of a default physical uplink control channel (PUCCH) resource; a spatial relation to which a default sounding reference signal (SRS) resource corresponds; and a spatial domain filter used for receiving the downlink control information;

if the downlink control information contains an SRI field and a scheduling offset is greater than or equal to a predetermined threshold, the processing unit 602 may transmit the uplink signal according to the spatial relation to which the SRS resource indicated by the SRI field corresponds;

and if a scheduling offset is less than a predetermined threshold, the processing unit 602 may transmit the uplink signal according to a spatial relation or spatial domain filter to which the latest uplink transmission corresponds.

In this implementation, the above default PUCCH resource may be a PUCCH resource with a minimal ID on an active UL BWP of a cell where the uplink signal is transmitted.

In this implementation, the above default SRS resource may be an SRS resource with a minimal ID in an SRS resource set. The SRS resource set may be an SRS resource set associated with the transmission of the above uplink signal.

In this implementation, if the downlink control information contains an SRI field, then, the code points of the SRI field may be mapped one-to-one with the first $2^N$ SRS resources in the SRS resource set associated with the transmission of the uplink signal; where, N is the number of bits of the SRI field, and N>0;

or, the mapping relation between the code points of the SRI field and the SRS resources in the SRS resource set associated with the transmission of the uplink signal may be determined according to the RRC signaling.

In this implementation, the above uplink transmission may be at least one of the following uplink signals: a PUSCH, a PUCCH, an SRS and a PRACH.

In this implementation, the scheduling offset and the threshold may be determined based on one of the following subcarrier spacings:

a subcarrier spacing for reception of the downlink control information (the subcarrier spacing for the reception of the DCI); and a subcarrier spacing for reception of an uplink signal scheduled by the downlink control information (the subcarrier spacing for the reception of the PUSCH scheduled by the DCI).

In this embodiment, the processing unit 602 may further transmit the uplink signal scheduled by the downlink control information according to the pathloss reference signal indication of the downlink control information.

In one implementation, the pathloss reference signal indication is indicated by the SRI field, then, if the downlink control information contains no SRI field, or if the downlink control information contains an SRI field but is not configured with the mapping relation between an SRI and a corresponding pathloss reference signal, if the spatial relation is applicable, the pathloss reference signal may be one of the following: a spatial relation reference signal to which a default physical uplink control channel (PUCCH) resource corresponds, a spatial relation reference signal to which a default sounding reference signal (SRS) resource corresponds, and a reference signal related to a TCI state or a QCL assumption to which the downlink control information corresponds, thus the processing unit 602 may transmit the uplink signal by taking the above reference signal as the pathloss reference signal;

if the spatial relation is not applicable, the above pathloss reference signal is a default pathloss reference signal, thus the processing unit 602 may transmit the uplink signal according to the default pathloss reference signal;

and if the downlink control information contains an SRI field and is configured with the mapping relation between an SRI and a corresponding pathloss reference signal, the processing unit 602 may transmit the uplink signal according to the pathloss reference signal indicated by the SRI field.

In this implementation, the above default PUCCH resource may be a PUCCH resource with a minimal ID on an active UL BWP of a cell to which the uplink signal corresponds (a cell where the uplink signal is transmitted).

In this implementation, the above default SRS resource is an SRS resource with a minimal ID in an SRS resource set. The SRS resource set may be an SRS resource set associated with the transmission of the above uplink signal.

In another embodiment, the pathloss reference signal indication is indicated by the SRI field, then, if the downlink control information contains no SRI field, or if the downlink control information contains an SRI field but is not configured with the mapping relation between an SRI and a corresponding pathloss reference signal, then, if the spatial relation is applicable and a scheduling offset is greater than or equal to a predetermined threshold, the pathloss reference signal may be one of the following: a spatial relation reference signal to which the default physical uplink control channel (PUCCH) resource corresponds, a spatial relation reference signal to which a default sounding reference signal (SRS) resource corresponds, and a reference signal related to the TCJ state or QCL hypothesis corresponding to the downlink control information; thus, the processing unit 602 may transmit the uplink signal by taking the above reference signal as a pathloss reference signal;

if the spatial relation is applicable and a scheduling offset is less than a predetermined threshold, the pathloss reference signal may be a reference signal related to a spatial relation or spatial domain filter of the latest uplink transmission; thus, the processing unit 602 may transmit the uplink signal by taking the above reference signal as a pathloss reference signal;

if the spatial relation is not applicable, the above pathloss reference signal may be a default pathloss reference signal; thus, the processing unit 602 may transmit the uplink signal according to the default pathloss reference signal;

and if the downlink control information contains an SRI field and is configured with the mapping relation between an SRI and a corresponding pathloss reference signal, the processing unit 602 may transmit the uplink signal according to the pathloss reference signal indicated by the SRI field.

In this implementation, the above default PUCCH resource may be a PUCCH resource with a minimal ID on an active UL BWP of a cell to which the uplink signal corresponds (a cell where the uplink signal is transmitted).

In this implementation, the above default SRS resource may be an SRS resource with a minimal ID in an SRS resource set. The SRS resource set may be an SRS resource set associated with the transmission of the above uplink signal.

In this implementation, the above uplink transmission may be at least one of the following uplink signals: a PUSCH, a PUCCH, an SRS and a PRACH.

In this implementation, the scheduling offset and the threshold may be determined based on one of the following subcarrier spacings:

a subcarrier spacing for reception of the downlink control information (the subcarrier spacing for the reception of the DCI); and a subcarrier spacing for reception of an uplink signal scheduled by the downlink control information (the subcarrier spacing for the reception of the PUSCH scheduled by the DCI).

In this embodiment, the number of bits to which at least one field of the downlink control information corresponds is configurable, as for the fields where the number of bits can be configurable have been described in Embodiment 1, and being not going to be described herein any further.

According the embodiment of this disclosure, the terminal equipment and the network device may transmit or receive corresponding signals by using accurate power and spatial direction, thereby improving reliability of signal reception or transmission.

Embodiment 6

The embodiment of this disclosure provides a signal reception or transmission apparatus, configured in a network device. As principles of the apparatus for solving problems are similar to that of the method of Embodiment 2, reference may be made to the implementation of the method of Embodiment 2 for implementation of this apparatus, with identical parts being not going to be described herein any further.

Figure 7:
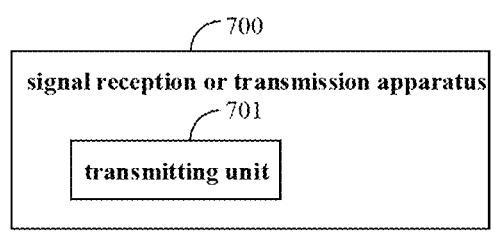
FIG. 7 is a schematic diagram of the signal reception or transmission apparatus of Embodiment 6.

FIG. 7 is a schematic diagram of a signal reception or transmission apparatus 700 of this embodiment. As shown in FIG. 7, the apparatus 700 includes:

a transmitting unit 701 configured to transmit downlink control information to a terminal equipment, a field of the downlink control information satisfying at least one of first conditions, the first conditions having been described in detail in Embodiment 1, the contents of which being incorporated herein, and being not going to be described herein any further.

In this embodiment, the downlink control information includes a spatial direction indication, and the terminal equipment may receive or transmit a signal scheduled by the downlink control information according to the spatial direction indication.

For example, the signal scheduled by the downlink control information is a downlink signal, and the above spatial direction indication is an indication of a QCL assumption or TCI state of the downlink signal.

For another example, the signal scheduled by the downlink control information is an uplink signal, and the above spatial direction indication is an indication of a spatial relationship of the uplink signal.

In this embodiment, the downlink control information may further include a pathloss reference signal indication, and the terminal equipment may transmit the uplink signal scheduled by the downlink control information according to the pathloss reference signal indication.

In this embodiment, the number of bits to which at least one of fields of the downlink control information corresponds is configurable. The field with configurable number of bits has been described in Embodiment 1, and shall not be described herein any further.

According the embodiment of this disclosure, the terminal equipment and the network device may transmit or receive corresponding signals by using accurate power and spatial direction, thereby improving reliability of signal reception or transmission.

Embodiment 7

The embodiment of this disclosure provides a signal reception or transmission apparatus, configured in a terminal equipment. As principles of the apparatus for solving problems are similar to that of the method of Embodiment 3, reference may be made to the implementation of the method of Embodiment 3 for implementation of this apparatus, with identical parts being not going to be described herein any further.

Figure 8:
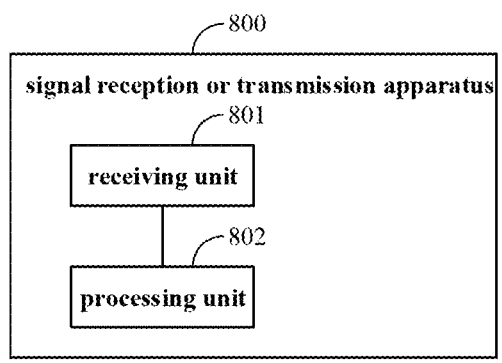
FIG. 8 is a schematic diagram of the signal reception or transmission apparatus of Embodiment 7.

FIG. 8 is a schematic diagram of a signal reception or transmission apparatus 800 of this embodiment. As shown in FIG. 8, the apparatus 800 includes a receiving unit 801 and a processing unit 802. The receiving unit 801 is configured to receive downlink control information transmitted by a network device, the downlink control information including a scheduling offset. The processing unit 802 is configured to receive a downlink signal scheduled by the downlink control information, or transmit an uplink signal scheduled by the downlink control information, according to spatial direction indication to which the scheduling offset corresponds or according to a pathloss reference signal to which the scheduling offset corresponds.

In this embodiment, the scheduling offset and a threshold to which the scheduling offset corresponds are determined based on one of the following subcarrier spacings:

a subcarrier spacing for reception of the downlink control information (the subcarrier spacing for the reception of the DCI);

a subcarrier spacing for reception of the downlink signal scheduled by the downlink control information (the subcarrier spacing for the reception of the PDSCH scheduled by the DCI); and a subcarrier spacing for transmission of the uplink signal scheduled by the downlink control information (the subcarrier spacing for the transmission of the PUSCH scheduled by the DCI).

As the subcarrier spacing on which the scheduling offset and the threshold to which the scheduling offset corresponds are based is specified, a problem of ambiguity in behaviors of the terminal equipment in performing corresponding operations is avoided, and reliability of signal reception and transmission is improved.

Embodiment 8

The embodiment of this disclosure provides a signal reception or transmission apparatus, configured in a network device. As principles of the apparatus for solving problems are similar to that of the method of Embodiment 4, reference may be made to the implementation of the method of Embodiment 4 for implementation of this apparatus, with identical parts being not going to be described herein any further.

Figure 9:
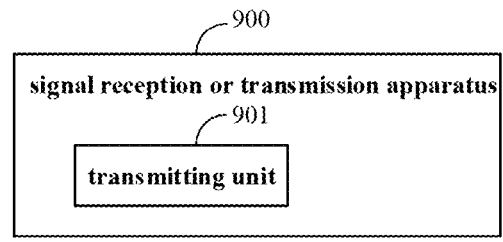
FIG. 9 is a schematic diagram of the signal reception or transmission apparatus of Embodiment 8.

FIG. 9 is a schematic diagram of a signal reception or transmission apparatus 900 of this embodiment. As shown in FIG. 9, the apparatus 900 includes:

a transmitting unit 901 configured to transmit downlink control information to a terminal equipment, the downlink control information including a scheduling offset, the scheduling offset corresponding to a spatial direction indication or corresponding to a pathloss reference signal, and the downlink control information being used by the terminal equipment to receive a downlink signal scheduled by the downlink control information or transmit an uplink signal scheduled by the downlink control information according to the spatial direction indication to which the scheduling offset corresponds or according to the pathloss reference signal to which the scheduling offset corresponds.

In this embodiment, the scheduling offset and a threshold to which the scheduling offset corresponds are determined based on one of the following subcarrier spacings:

a subcarrier spacing for reception of the downlink control information (the subcarrier spacing for the reception of the DCI);

a subcarrier spacing for reception of the downlink signal scheduled by the downlink control information (the subcarrier spacing for the reception of the PDSCH scheduled by the DCI); and a subcarrier spacing for transmission of the uplink signal scheduled by the downlink control information (the subcarrier spacing for the transmission of the PUSCH scheduled by the DCI).

As the subcarrier spacing on which the scheduling offset and the threshold to which the scheduling offset corresponds are based is specified, a problem of ambiguity in behaviors of the terminal equipment in performing corresponding operations is avoided, and reliability of signal reception and transmission is improved.

Embodiment 9

The embodiment of this disclosure provides a terminal equipment, including the apparatus as described in Embodiment 5 or 7.

Figure 10:
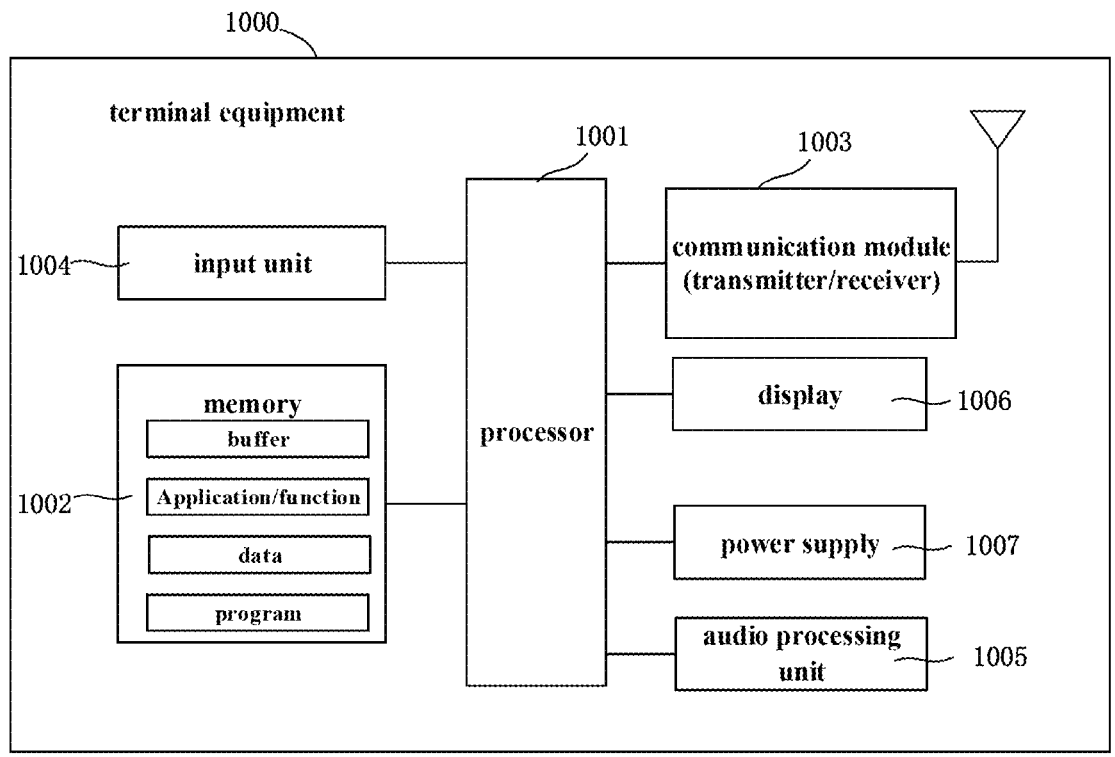
FIG. 10 is a schematic diagram of the terminal equipment of Embodiment 9.

FIG. 10 is a schematic diagram of the terminal equipment of the embodiment of this disclosure. As shown in FIG. 10, a terminal equipment 1000 may include a central processing unit 1001 and a memory 1002, the memory 1002 being coupled to the central processing unit 1001. It should be noted that this figure is illustrative only, and other types of structures may also be used, so as to supplement or replace this structure and achieve a telecommunications function or other functions.

In one implementation, the functions of the apparatus as described in Embodiment 5 or 7 may be integrated into the central processing unit 1001, and the functions of the apparatus as described in Embodiment 5 or 7 are achieved by the central processing unit 1001. The functions of the apparatus as described in Embodiment 5 or 7 are incorporated herein, and shall not be described herein any further.

In another implementation, the apparatus as described in Embodiment 5 or 7 and the central processing unit 1001 may be configured separately; for example, the apparatus as described in Embodiment 5 or 7 may be configured as a chip connected to the central processing unit 1001, and the functions of the apparatus as described in Embodiment 5 or 7 are achieved under control of the central processing unit 1001.

As shown in FIG. 10, the terminal equipment 1000 may further include a communication module 1003, an input unit 1004, an audio processing unit 1005, a display 1006, and a power supply 1007, etc. It should be noted that the terminal equipment 1000 does not necessarily include all the parts shown in FIG. 10. Furthermore, the terminal equipment 1000 may include parts not shown in FIG. 10, and the related art may be referred to.

As shown in FIG. 10, the central processing unit 1001 is sometimes referred to as a controller or an operational control, which may include a microprocessor or other processor devices and/or logic devices. The central processing unit 1001 receives input and controls operations of components of the terminal equipment 1000.

The memory 1002 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 1001 may execute programs stored in the memory 1002, so as to realize information storage or processing, etc. Functions of other parts are similar to those of the related art, which shall not be described herein any further. The parts of the terminal equipment 1000 may be realized by specific hardware, firmware, software, or any combination thereof, without departing from the scope of this disclosure.

With the terminal equipment of the embodiment, the reliability of signal reception and transmission is improved.

Embodiment 10

The embodiment of this disclosure provides a network device, including the apparatus as described in Embodiment 6 or 8.

Figure 11:
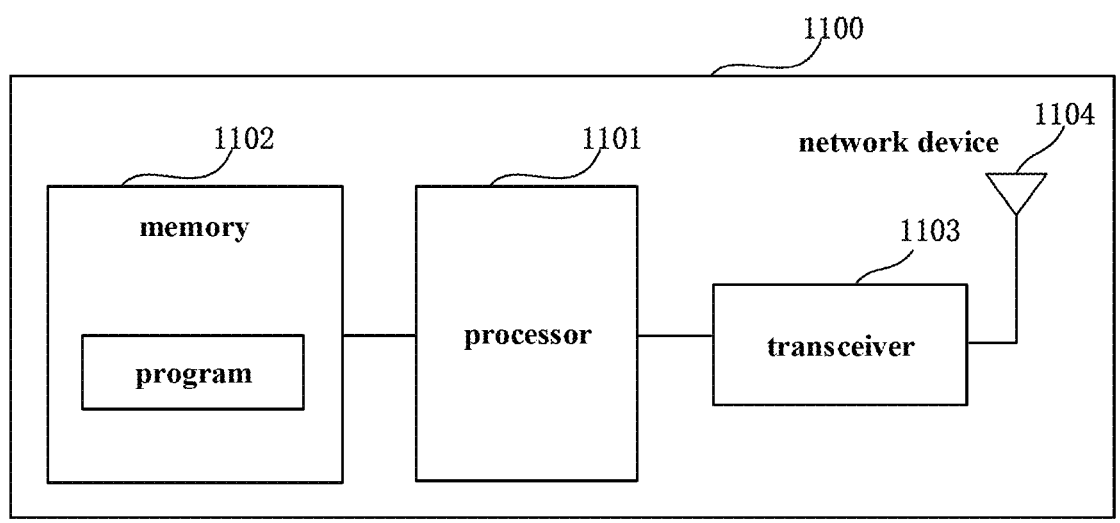
FIG. 11 is a schematic diagram of the network device of Embodiment 10.

FIG. 11 is a schematic diagram of a structure of one implementation of the network device of the embodiment of this disclosure. As shown in FIG. 11, a network device 1100 may include a central processing unit (CPU) 1101 and a memory 1102, the memory 1102 being coupled to the central processing unit 1101. The memory 1102 may store various data, and furthermore, it may store a program for data processing, and execute the program under control of the central processing unit 1101, so as to receive various data transmitted by a terminal equipment and transmit various data to the terminal equipment.

In one implementation, the functions of the apparatus described in Embodiment 6 or 8 may be integrated into the central processing unit 1101, and the central processing unit 1101 achieves the functions of the apparatus described in Embodiment 6 or 8. The functions of the apparatus described in Embodiment 6 or 8 are incorporated herein, and shall not be described herein any further.

In another implementation, the apparatus described in Embodiment 6 or 8 and the central processing unit 1101 may be configured separately; for example, the apparatus described in Embodiment 6 or 8 may be configured as a chip connected to the central processing unit 1101, and the functions of the apparatus described in Embodiment 6 or 8 are achieved under control of the central processing unit 1101.

Furthermore, as shown in FIG. 11, the network device 1100 may include a transceiver 1103, and an antenna 1104, etc. Functions of the above components are similar to those in the related art, and shall not be described herein any further. It should be noted that the network device 1100 does not necessarily include all the parts shown in FIG. 11, and furthermore, the network device 1100 may include parts not shown in FIG. 11, and the related art may be referred to.

With the network device of this embodiment, the reliability of signal reception or transmission is improved.

Embodiment 11

The embodiment of this disclosure provides a communication system, including a network device and a terminal equipment, the network device being, for example, the network device 1100 as described in Embodiment 10, and the terminal equipment being, for example, the terminal equipment 1000 as described in Embodiment 9.

In this embodiment, the terminal equipment is, for example, a UE served by a gNB, and may include conventional compositions and functions of a terminal equipment in addition to the functions of the apparatus described in Embodiment 5 or 7, which are as described in Embodiment 9, and shall not be described herein any further.

In this embodiment, the network device may be, for example, a gNB in NR, and may include conventional compositions and functions of a network device in addition to the functions of the apparatus described in Embodiment 6 or 8, which are as described in Embodiment 10, and shall not be described herein any further.

With the communication system of this embodiment, the reliability of signal reception or transmission is improved.

An embodiment of this disclosure provides a computer readable program, which, when executed in a terminal equipment, will cause a computer to carry out the method as described in Embodiment 1 or 3 in the terminal equipment.

An embodiment of this disclosure provides a storage medium storing a computer readable program, which will cause a computer to carry out the method as described in Embodiment 1 or 3 in a terminal equipment.

An embodiment of this disclosure provides a computer readable program, which, when executed in a network device, will cause a computer to carry out the method as described in Embodiment 2 or 4 in the network device.

An embodiment of this disclosure provides a storage medium storing a computer readable program, which will cause a computer to carry out the method as described in Embodiment 2 or 4 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to the implementations disclosed in the above embodiments, following supplements are further disclosed.

1. A signal reception or transmission apparatus, configured in a terminal equipment, the apparatus including:
   a receiving unit configured to receive downlink control information transmitted by a network device, a field of the downlink control information satisfying at least one of the following conditions that:
   if the downlink control information is used for scheduling a downlink signal, a field of frequency-domain resource assignment of the downlink control information is smaller than a field of frequency-domain resource assignment of DCI format 1_0;
   if the downlink control information is used for scheduling an uplink signal, a field of frequency-domain resource assignment of the downlink control information is smaller than a field of frequency-domain resource assignment of DCI format 0_0;
   a field of time-domain resource assignment is less than 4 bits;
   a field of a modulation and coding scheme is less than 5 bits;
   a field of HARQ process number is less than 4 bits;
   a field of a redundancy version is less than 2 bits;
   a field of a PUCCH resource indicator is less than 3 bits;
   a field of a PDSCH-to-HARQ feedback timing indicator is less than 3 bits; and
   a field of a downlink assignment index is less than 2 bits;
   a processing unit configured to receive or transmit a signal scheduled by the downlink control information according to spatial direction indication of the downlink control information.

2. The apparatus according to supplement 1, wherein,
   the processing unit is further configured to transmit an uplink signal scheduled by the downlink control information according to pathloss reference signal indication of the downlink control information.

3. The apparatus according to supplement 1, wherein the signal scheduled by the downlink control information is a downlink signal, and the spatial direction indication is indication of a QCL assumption or transmission configuration indication (TCI) state of the downlink signal.

4. The apparatus according to supplement 3, wherein the downlink control information does not include a TCI field, and a scheduling offset to which the downlink control information corresponds is greater than or equal to a predetermined threshold;
   and the processing unit is configured to receive the downlink signal according to one of the following QCL assumptions or TCI states:
   a TCI state or a QCL assumption to which a control resource set (CORESET) corresponds, the control resource set (CORESET) corresponding to the reception of the downlink control information;
   a TCI state or a QCL assumption to which a default control resource set (CORESET) corresponds; and
   a default TCI state used for downlink signal indication.

5. The apparatus according to supplement 3, wherein the downlink control information includes a TCI field, and a scheduling offset to which the downlink control information corresponds is greater than or equal to a predetermined threshold;
   and the processing unit is configured to receive the downlink signal according to a TCI state indicated by the TCI field.

6. The apparatus according to supplement 3, wherein a scheduling offset to which the downlink control information corresponds is less than a predetermined threshold; and the processing unit is configured to receive the downlink signal according to a default TCI state or QCL assumption.

7. The apparatus according to any one of supplements 4-6, wherein the scheduling offset and the threshold are determined based on one of the following subcarrier spacings:
   a subcarrier spacing for reception of the downlink control information (the subcarrier spacing for the reception of the DCI); and
   a subcarrier spacing for reception of a downlink signal scheduled by the downlink control information (the subcarrier spacing for the reception of PDSCH scheduled by the DCI).

8. The apparatus according to supplement 4, wherein the default TCI state used for downlink signal indication is a first entry of one or more entries used for indicating TCI states of the downlink signal configured and/or activated by higher-layer signaling.

9. The apparatus according to supplement 5, wherein,
   code points of the TCI field are mapped one-to-one with the first $2^N$ TCI states in TCI states activated by MAC CE signaling; where, N is the number of bits of the TCI field, N>0; or,
   a mapping relation between code points of the TCI field and TCI states activated by MAC CE signaling is determined according to RRC signaling.

10. The apparatus according to supplement 6, wherein,
    the default TCI state or QCL assumption is identical to a TCI state or QCL assumption of a CORESET with a minimal ID in the latest slot;
    wherein the CORESET is associated with a monitored search space in the latest slot, and the CORESET is located on an active BWP of a current serving cell.

11. The apparatus according to supplement 1, wherein the signal scheduled by the downlink control information is an uplink signal, and the spatial direction indication is indication of a spatial relation of the uplink signal.

12. The apparatus according to supplement 11, wherein the downlink control information does not include an SRI field;
    and the processing unit is configured to transmit the uplink signal according to one of the following spatial relations or a spatial domain filter:
    a spatial relation of a default physical uplink control channel (PUCCH) resource; a spatial relation to which a default sounding reference signal (SRS) resource corresponds; and
    a spatial domain filter used for receiving the downlink control information.

13. The apparatus according to supplement 11, wherein the downlink control information includes an SRI field;

and the processing unit is configured to transmit the uplink signal according to a spatial relation associated with SRS resources indicated by the SRI field.

14. The apparatus according to supplement 11, wherein the downlink control information does not include an SRI field, and a scheduling offset to which the downlink control information corresponds is greater than or equal to a predetermined threshold;
and the processing unit is configured to transmit the uplink signal according to one of the following spatial relations or spatial domain filter:
a spatial relation of a default physical uplink control channel (PUCCH) resource;
a spatial relation to which a default sounding reference signal (SRS) resource correspond; and
a spatial domain filter used for receiving the downlink control information.

15. The apparatus according to supplement 11, wherein the downlink control information includes an SRI field, and a scheduling offset to which the downlink control information corresponds is greater than or equal to a predetermined threshold;
and the processing unit is configured to transmit the uplink signal according to a spatial relation to which SRS resources indicated by the SRI field correspond.

16. The apparatus according to supplement 11, wherein a scheduling offset to which the downlink control information corresponds is less than a predetermined threshold;
and the processing unit is configured to transmit the uplink signal according to a spatial relation or a spatial domain filter to which the latest uplink transmission corresponds.

17. The apparatus according to any one of supplements 11-16, wherein the default PUCCH resource is a PUCCH resource with a minimal ID on an active UL BWP of a cell where the uplink signal is transmitted.

18. The apparatus according to any one of supplements 11-16, wherein the default SRS resource is an SRS resource with a minimal ID in a SRS resource set.

19. The apparatus according to supplement 18, wherein the SRS resource set is associated with transmission of the uplink signal.

20. The apparatus according to supplement 13 or 15, wherein,
code points of the SRS field are mapped one-to-one with the first $2^N$ SRS resources in the SRS resource set associated with transmission of the uplink signal; where, N is the number of bits of the SRS field, N>0; or,
a mapping relation between code points of the SRS field and SRS resources in the SRS resource set associated with transmission of the uplink signal is determined according to RRC signaling.

21. The apparatus according to supplement 16, wherein the uplink transmission is at least one of the following uplink signals:
a PUSCH;
a PUCCH;
an SRS;
and a PRACH.

22. The apparatus according to any one of supplements 14-16, wherein the scheduling offset and the threshold are determined based on one of the following subcarrier spacings:
a subcarrier spacing for reception of the downlink control information (the subcarrier spacing for the reception of the DCI); and
a subcarrier spacing for reception of the uplink signal scheduled by the downlink control information (the subcarrier spacing for the reception of the PUSCH scheduled by the DCI).

23. The apparatus according to supplement 2, wherein the downlink control information does not include an SRI field, or the downlink control information includes an SRI field but a mapping relation between an SRI and a corresponding pathloss reference signal is not configured, if the spatial relation is applicable, the pathloss reference signal is one of the following: a spatial relation reference signal to which a default physical uplink control channel (PUCCH) resource corresponds, a spatial relation reference signal to which a default sounding reference signal (SRS) resource corresponds, and a reference signal related to a TCI state or a QCL assumption to which the downlink control information corresponds;
and if the spatial relation is not applicable, the pathloss reference signal is a default pathloss reference signal.

24. The apparatus according to supplement 2, wherein the downlink control information does not include an SRI field, or the downlink control information includes an SRI field but a mapping relation between an SRI and a corresponding pathloss reference signal is not configured,
if the spatial relation is applicable and the scheduling offset is greater than or equal to a predetermined threshold, the pathloss reference signal is one of the following: a spatial relation reference signal to which a default physical uplink control channel (PUCCH) resource corresponds, a spatial relation reference signal to which a default sounding reference signal (SRS) resource corresponds, and a reference signal related to a TCI state or a QCL assumption to which the downlink control information corresponds;
if the spatial relation is applicable and the scheduling offset is less than the predetermined threshold, the pathloss reference signal is a reference signal related to a spatial relation or a spatial domain filter of the latest uplink transmission;
and if the spatial relation is not applicable, the pathloss reference signal is a default pathloss reference signal.

25. The apparatus according to supplement 2, wherein the downlink control information includes an SRI field, and a mapping relation between an SRI and a corresponding pathloss reference signal is configured;
and the processing unit is configured to transmit the uplink signal according to a pathloss reference signal indicated by the SRI field.

26. The apparatus according to supplement 23 or 24, wherein the default PUCCH resource is a PUCCH resource with a minimal ID on an active UL BWP of a cell to which the uplink signal corresponds.

27. The apparatus according to supplement 23 or 24, wherein the default SRS resource is an SRS resource with a minimal ID in a SRS resource set.

28. The apparatus according to supplement 27, wherein the SRS resource set is related to the uplink signal.

29. The apparatus according to supplement 24, wherein the uplink transmission is at least one of the following uplink signals:
a PUSCH;
a PUCCH;
an SRS;
and a PRACH.

30. The apparatus according to supplement 24, wherein the scheduling offset and the threshold are determined based on one of the following subcarrier spacings:

a subcarrier spacing for reception of the downlink control information (the subcarrier spacing for the reception of the DCI); and a subcarrier spacing for reception of the uplink signal scheduled by the downlink control information (the subcarrier spacing for the reception of the PUSCH scheduled by the DCI).

31. The apparatus according to any one of supplements 1-30, wherein the number of bits to which at least one of the following fields of the downlink control information corresponds is configurable:
an antenna port;
a transmission configuration indication;
a rate matching indicator;
an SRS request;
a PRB bundling size indicator;
a carrier indicator;
a CSI request;
ZP CSI-RS triggering;
a Beta offset indicator;
an SRS resource indicator;
a repetition factor; and
priority indication.

1B. A signal reception or transmission apparatus, configured in a network device, the apparatus including:
a transmitting unit configured to transmit downlink control information to a terminal equipment, a field of the downlink control information satisfying at least one of the following conditions that:
if the downlink control information is used for scheduling a downlink signal, a field of frequency-domain resource assignment of the downlink control information is smaller than a field of frequency-domain resource assignment of DCI format 1_0;
if the downlink control information is used for scheduling an uplink signal, a field of frequency-domain resource assignment of the downlink control information is smaller than a field of frequency-domain resource assignment of DCI format 0_0;
a field of time-domain resource assignment is less than 4 bits;
a field of a modulation and coding scheme is less than 5 bits;
a field of the HARQ process number is less than 4 bits;
a field of a redundancy version is less than 2 bits;
a field of a PUCCH resource indicator is less than 3 bits;
a field of a PDSCH-to-HARQ feedback timing indicator is less than 3 bits; and
a field of a downlink assignment index is less than 2 bits;
the downlink control information having spatial direction indication, and the terminal equipment receiving or transmitting a signal scheduled by the downlink control information according to the spatial direction indication of the downlink control information.

2B. The apparatus according to supplement 1B, wherein the downlink control information further includes a pathloss reference signal indication, and the terminal equipment transmits the uplink signal scheduled by the downlink control information according to the pathloss reference signal indication of the downlink control information.

3B. The apparatus according to supplement 1B, wherein the signal scheduled by the downlink control information is a downlink signal, and the spatial direction indication is indication of a QCL assumption or TCI state of the downlink signal.

4B. The apparatus according to supplement 1B, wherein the signal scheduled by the downlink control information is an uplink signal, and the spatial direction indication is indication of a spatial relation of the uplink signal.

5B. The apparatus according to any one of supplements 1B-4B, wherein the number of bits to which at least one of the following fields of the downlink control information corresponds is configurable:
an antenna port;
a transmission configuration indication;
a rate matching indicator;
an SRS request;
a PRB bundling size indicator;
a carrier indicator;
a CSI request;
ZP CSI-RS triggering;
a Beta offset indicator;
an SRS resource indicator;
a repetition factor; and
priority indication.

1C. A signal reception or transmission apparatus, configured in a terminal equipment, the apparatus including:
a receiving unit configured to receive downlink control information transmitted by a network device, the downlink control information including a scheduling offset; and
a processing unit configured to receive a downlink signal scheduled by the downlink control information, or transmit an uplink signal scheduled by the downlink control information, according to spatial direction indication to which the scheduling offset corresponds or according to a pathloss reference signal to which the scheduling offset corresponds;
wherein, the scheduling offset and a threshold to which the scheduling offset corresponds are determined based on one of the following subcarrier spacings:
a subcarrier spacing for reception of the downlink control information (the subcarrier spacing for the reception of the DCI);
a subcarrier spacing for reception of the downlink signal scheduled by the downlink control information (the subcarrier spacing for the reception of the PDSCH scheduled by the DCI); and
a subcarrier spacing for transmission of the uplink signal scheduled by the downlink control information (the subcarrier spacing for the transmission of the PUSCH scheduled by the DCI).

1D. A signal reception or transmission apparatus, configured in a network device, the apparatus including:
a transmitting unit configured to transmit downlink control information to a terminal equipment, the downlink control information including a scheduling offset, the scheduling offset corresponding to a spatial direction indication or corresponding to a pathloss reference signal, and the downlink control information being used by the terminal equipment to receive a downlink signal scheduled by the downlink control information or transmit an uplink signal scheduled by the downlink control information according to the spatial direction indication to which the scheduling offset corresponds or according to the pathloss reference signal to which the scheduling offset corresponds;
wherein the scheduling offset and a threshold to which the scheduling offset corresponds are determined based on one of the following subcarrier spacings:
a subcarrier spacing for reception of the downlink control information;
a subcarrier spacing for reception of the downlink signal scheduled by the downlink control information; and a subcarrier spacing for transmission of the uplink signal scheduled by the downlink control information.

What is claimed is:

1. A communication apparatus, configured in a terminal equipment, the apparatus comprising:
a receiver configured to receive downlink control information transmitted by a network device, the downlink control information being used to schedule Physical Downlink Shared Channel (PDSCH);
processor circuitry configured to receive a first PDSCH scheduled by the downlink control information according to spatial direction indication of the downlink control information,
wherein,
the spatial direction indication is indication of a Quasi Co Location (QCL) assumption or an indication of a transmission configuration indication (TCI) state for the first PDSCH;
the downlink control information comprises a TCI field;
when the number of the codepoints in the TCI field is smaller than the number of TCI codepoints activated by a Media Access Control Control Element (MAC CE) signaling, the first $2^N$ TCI codepoints activated by the MAC CE signaling are applied to the downlink control information; where, N is the number of bits of the TCI field, N>0.

2. The apparatus according to claim 1, wherein,
the processor circuitry is further configured to transmit a first Physical Uplink Shared Channel (PUSCH) according to pathloss reference signal indication of the downlink control information.

3. The apparatus according to claim 2, wherein the downlink control information does not comprise a Sounding Reference Signal Resource Indicator (SRI) field, or the downlink control information comprises an SRI field but a mapping relation between an SRI and a corresponding pathloss reference signal is not configured,
if the spatial relation is applicable, the pathloss reference signal is one of the following: a spatial relation reference signal to which a default physical uplink control channel (PUCCH) resource corresponds, a spatial relation reference signal to which a default sounding reference signal (SRS) resource corresponds, and a reference signal related to a TCI state or a QCL assumption to which the downlink control information corresponds;
and if the spatial relation is not applicable, the pathloss reference signal is a default pathloss reference signal.

4. The apparatus according to claim 2, wherein the downlink control information does not comprise an SRI field, or the downlink control information comprises an SRI field but a mapping relation between an SRI and a corresponding pathloss reference signal is not configured,
if the spatial relation is applicable and a scheduling offset is greater than or equal to a predetermined threshold, the pathloss reference signal is one of the following: a spatial relation reference signal to which a default physical uplink control channel (PUCCH) resource corresponds, a spatial relation reference signal to which a default sounding reference signal (SRS) resource corresponds, and a reference signal related to a TCI state or a QCL assumption to which the downlink control information corresponds;

if the spatial relation is applicable and a scheduling offset is less than the predetermined threshold, the pathloss reference signal is a reference signal related to a spatial relation or a spatial domain filter of latest uplink transmission;
and if the spatial relation is not applicable, the pathloss reference signal is a default pathloss reference signal.

5. The apparatus according to claim 2, wherein the downlink control information comprises an SRI field, and a mapping relation between an SRI and a corresponding pathloss reference signal is configured;
and the processor circuitry is configured to transmit the first PUSCH according to a pathloss reference signal indicated by the SRI field.

6. The apparatus according to claim 1, wherein a scheduling offset to which the downlink control information corresponds and a predetermined threshold are determined based on one of the following subcarrier spacings:
a subcarrier spacing for reception of the downlink control information; and
a subcarrier spacing for reception of a downlink signal scheduled by the downlink control information.

7. The apparatus according to claim 1, wherein the number of bits to which at least one of the following fields of the downlink control information corresponds is configurable:
an antenna port;
a transmission configuration indication;
a rate matching indicator;
an SRS request;
a Physical Resource Block (PRB) bundling size indicator;
a carrier indicator;
a Channel State Information (CSI) request;
Zero Power Channel State Information-Reference Signal (ZP CSI-RS) triggering;
a Beta offset indicator;
an SRS resource indicator;
a repetition factor; and
priority indication.

8. A communication apparatus, configured in a network device, the apparatus comprising:
a transmitter configured to transmit downlink control information to a terminal equipment, the downlink control information being used to schedule Physical Downlink Shared Channel (PDSCH);
the downlink control information having spatial direction indication, and the terminal equipment receiving a first PDSCH scheduled by the downlink control information according to the spatial direction indication of the downlink control information,
wherein:
the spatial direction indication is indication of a Quasi Co Location (QCL) assumption or an indication of a transmission configuration indication (TCI) state for the first PDSCH;
the downlink control information comprises a TCI field;
when the number of the codepoints in the TCI field is smaller than the number of TCI codepoints activated by a Media Access Control Control Element (MAC CE) signaling, the first $2^N$ TCI codepoints activated by the MAC CE signaling are applied to the downlink control information; where, N is the number of bits of the TCI field, N>0.

* * * * *